(12) United States Patent
Park

(10) Patent No.: US 10,606,758 B2
(45) Date of Patent: Mar. 31, 2020

(54) MEMORY SYSTEM AND METHOD OF OPERATING THE SAME

(71) Applicant: SK hynix Inc., Gyeonggi-do (KR)

(72) Inventor: Byeong Gyu Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 35 days.

(21) Appl. No.: 15/987,429

(22) Filed: May 23, 2018

(65) Prior Publication Data

US 2019/0121743 A1    Apr. 25, 2019

(30) Foreign Application Priority Data

Oct. 23, 2017 (KR) .......................... 10-2017-0137652

(51) Int. Cl.
*G06F 12/00* (2006.01)
*G06F 12/10* (2016.01)

(52) U.S. Cl.
CPC ...... *G06F 12/10* (2013.01); *G06F 2212/1044* (2013.01); *G06F 2212/657* (2013.01); *G06F 2212/7201* (2013.01)

(58) Field of Classification Search
CPC ................................ G06F 3/061; G06F 12/10
See application file for complete search history.

(56) References Cited

U.S. PATENT DOCUMENTS

| | | | | |
|---|---|---|---|---|
| 6,738,875 B1 * | 5/2004 | Wang | ................. | G06F 12/0269 707/999.202 |
| 7,934,072 B2 * | 4/2011 | Hobbet | ................. | G06F 3/0608 711/155 |
| 8,819,386 B1 * | 8/2014 | Mather | ................. | G06F 12/10 711/202 |
| 9,032,138 B2 * | 5/2015 | Choi | ................. | G06F 12/02 711/103 |
| 9,251,067 B1 * | 2/2016 | Tomlin | ................. | G06F 12/0284 |
| 9,323,667 B2 * | 4/2016 | Bennett | ................. | G06F 12/0292 |
| 9,558,125 B2 * | 1/2017 | Thangaraj | ................. | G06F 11/1441 |
| 10,372,649 B2 * | 8/2019 | Eide | ................. | G06F 11/0793 |
| 2008/0005447 A1 * | 1/2008 | Schoenberg | ................. | G06F 12/1036 711/6 |
| 2009/0070517 A1 * | 3/2009 | Kaneko | ................. | G06F 12/0866 711/102 |

(Continued)

FOREIGN PATENT DOCUMENTS

KR    1020170035155    3/2017

OTHER PUBLICATIONS

International Business Machine, Time Bound of Nonvolatile Bitmap Initialization, Sep. 7, 2004. IP.com (Year: 2004).*

(Continued)

*Primary Examiner* — Khoa D Doan
(74) *Attorney, Agent, or Firm* — IP & T Group LLP

(57) ABSTRACT

Provided herein may be a memory system and a method of operating the memory system. The method may include: receiving an unmap command corresponding to logical addresses; setting a state of at least one unmap bit corresponding to the logical addresses among a plurality of unmap bits included in an unmap filter to an unmapped state in response to the unmap command; and setting a state of logical-to-physical address mapping information about a logical address, among the logical addresses, that does not correspond to the at least one unmap bit to an unmapped state.

20 Claims, 12 Drawing Sheets

(56) References Cited

U.S. PATENT DOCUMENTS

| | | | |
|---|---|---|---|
| 2009/0113121 A1* | 4/2009 | Lee | G06F 12/0246 711/103 |
| 2011/0231594 A1* | 9/2011 | Sugimoto | G06F 3/0616 711/103 |
| 2012/0110249 A1* | 5/2012 | Jeong | G06F 3/0616 711/103 |
| 2012/0254514 A1* | 10/2012 | Nishikubo | G06F 12/0246 711/103 |
| 2013/0132650 A1* | 5/2013 | Choi | G06F 12/02 711/103 |
| 2013/0151754 A1* | 6/2013 | Post | G06F 12/0246 711/103 |
| 2013/0219106 A1* | 8/2013 | Vogan | G06F 12/0246 711/103 |
| 2013/0275656 A1* | 10/2013 | Talagala | G06F 12/0246 711/103 |
| 2013/0275660 A1* | 10/2013 | Bennett | G06F 12/0292 711/103 |
| 2014/0047210 A1* | 2/2014 | Cohen | G06F 12/00 711/202 |
| 2014/0164730 A1* | 6/2014 | Gold | G06F 3/0608 711/171 |
| 2014/0195725 A1* | 7/2014 | Bennett | G06F 12/0246 711/103 |
| 2014/0325167 A1* | 10/2014 | Slegel | G06F 12/0891 711/159 |
| 2016/0117252 A1* | 4/2016 | Thangaraj | G06F 12/0246 711/118 |
| 2016/0266792 A1* | 9/2016 | Amaki | G06F 12/0246 |
| 2017/0039141 A1 | 2/2017 | Yeh et al. | |
| 2017/0060768 A1* | 3/2017 | Zhang | G06F 3/0619 |
| 2017/0123696 A1* | 5/2017 | Kelner | G06F 3/0619 |
| 2017/0147227 A1* | 5/2017 | Stabrawa | G06F 3/0608 |
| 2017/0147258 A1* | 5/2017 | Kim | G06F 3/0679 |
| 2017/0147499 A1* | 5/2017 | Mohan | G06F 3/0616 |
| 2018/0225200 A1* | 8/2018 | Seo | G06F 12/0646 |
| 2018/0267894 A1* | 9/2018 | Jangam | G06F 12/0246 |
| 2019/0034287 A1* | 1/2019 | Hsieh | G06F 12/0246 |
| 2019/0087348 A1* | 3/2019 | Liao | G06F 12/1009 |

OTHER PUBLICATIONS

Sangyeun Cho, Sanghoan Chang, Insoon Jo, The solid-state drive technology, today and tomorrow, IEEE 2015 31st International Conference on Data Engineering. (Year: 2015).*

* cited by examiner

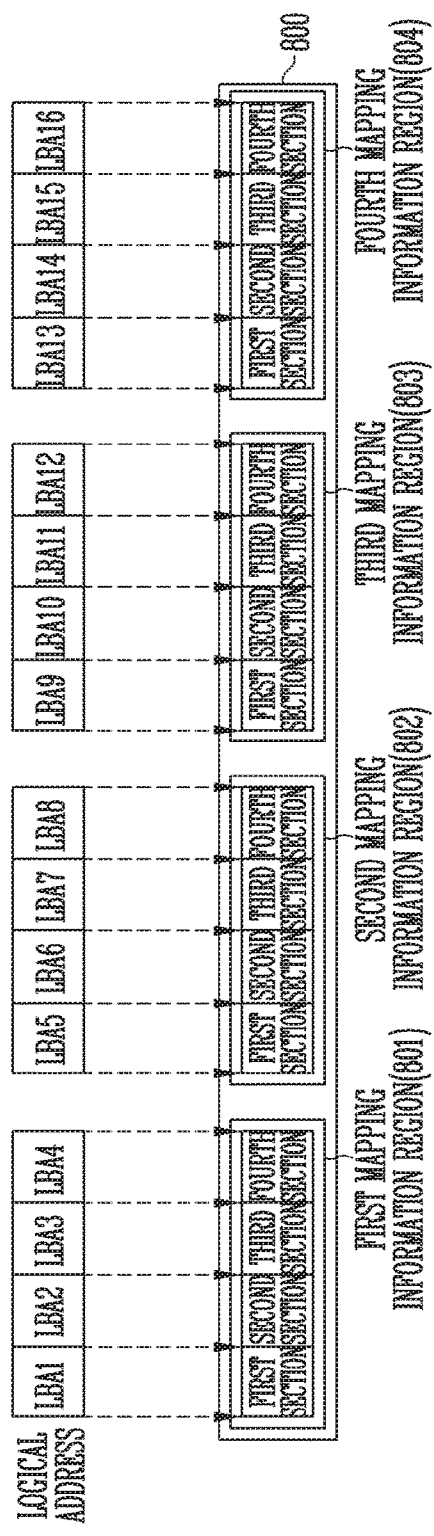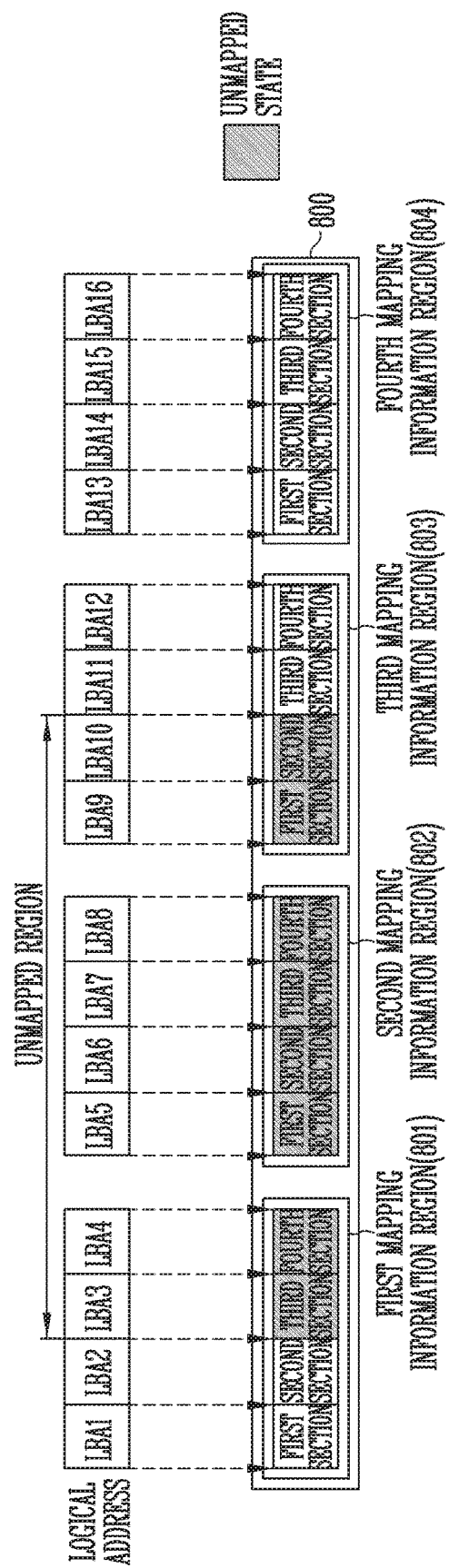

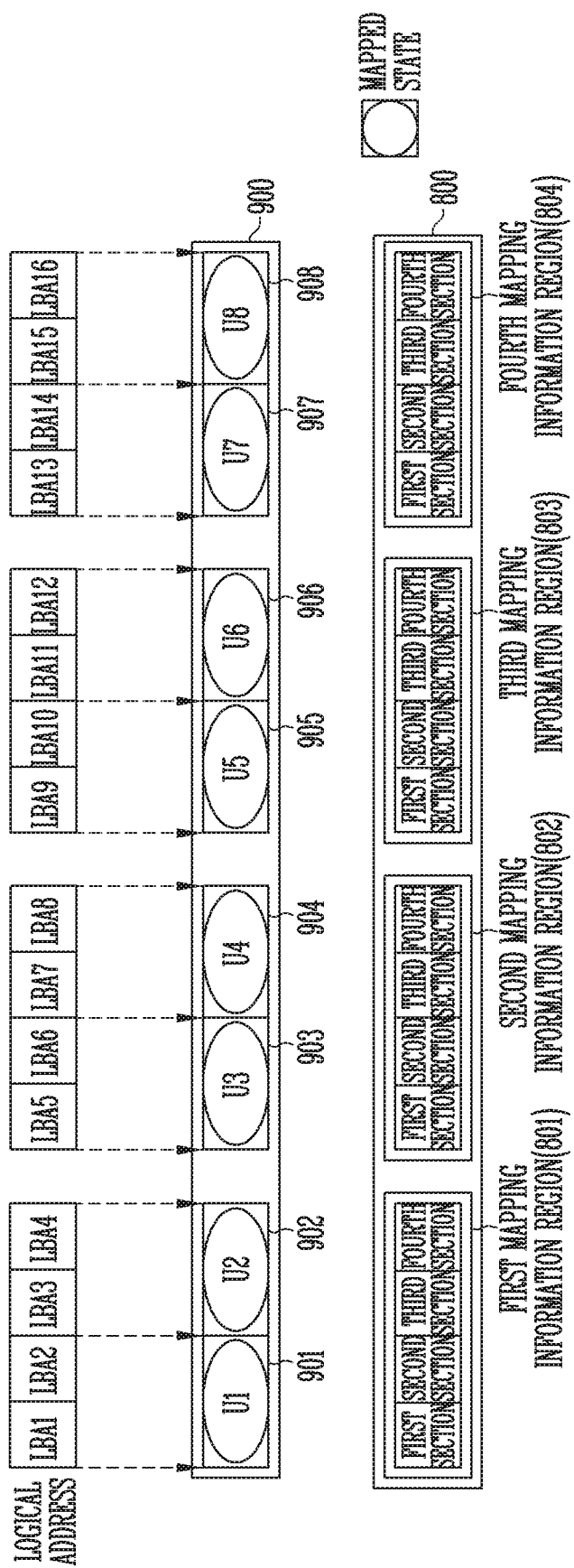

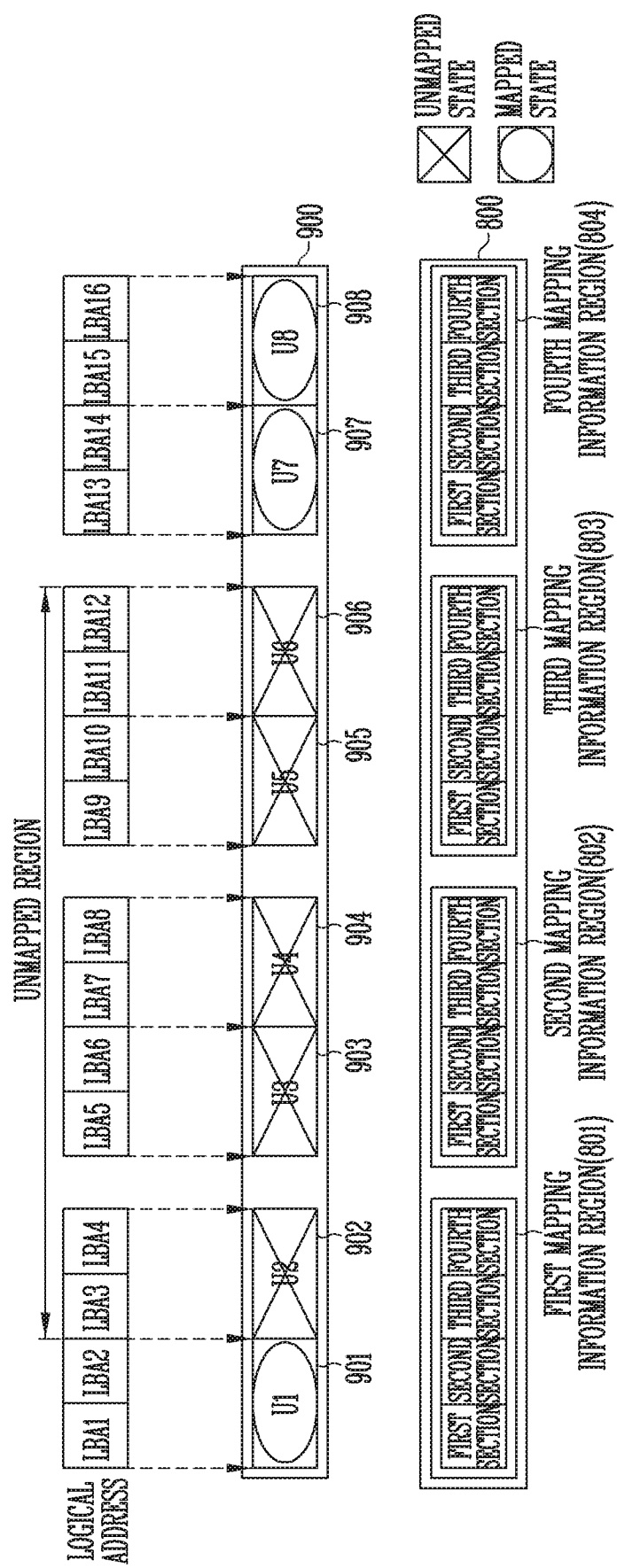

MEMORY SYSTEM AND METHOD OF OPERATING THE SAME

CROSS-REFERENCE TO RELATED APPLICATION

The present application claims priority under 35 U.S.C. § 119(a) to Korean patent application number 10-2017-0137652, filed on Oct. 23, 2017, which is incorporated herein by reference in its entirety.

BACKGROUND

1. Field of Invention

Various embodiments of the present disclosure generally relate to a memory system and a method of operating the memory system. Particularly, the embodiments relate to a memory system configured to efficiently manage logical-to-physical address mapping information using an unmap filter, and a method of operating such memory system.

2. Description of Related Art

A memory device may include a plurality of memory blocks. Each memory block may include a plurality of memory cells. The memory cells included in each memory block may be simultaneously erased.

When a write command and a logical address are input from a host, the memory system may allocate a physical address corresponding to the logical address and write data to a memory region corresponding to the physical address.

The memory system may store logical-to-physical address mapping information to a nonvolatile memory device. Furthermore, the memory system may change the state of the logical-to-physical address mapping information to an unmapped state in response to an unmap command input from the host.

SUMMARY

Various embodiments of the present disclosure are directed to a memory system capable of efficiently managing logical-to-physical address mapping information, and a method of operating the memory system.

An embodiment of the present disclosure may provide for a method of operating a memory system, including: receiving an unmap command corresponding to logical addresses; setting a state of at least one unmap bit corresponding to the logical addresses among a plurality of unmap bits included in an unmap filter to an unmapped state in response to the unmap command; and setting a state of logical-to-physical address mapping information about a logical address, among the logical addresses, that does not correspond to the at least one unmap bit to an unmapped state.

An embodiment of the present disclosure may provide for a method of operating a memory system, including: checking an unmap bit set to an unmapped state among a plurality of unmap bits included in an unmap filter stored in a first memory region of a nonvolatile memory; determining an unmapped first logical address based on the check of the unmap bit set to the unmapped state; determining an unmapped second logical address from logical-to-physical address mapping information stored in a second memory region of the nonvolatile memory; and determining an unmapped logical address region based on the first logical address and the second logical address.

An embodiment of the present disclosure may provide for a memory system including: a nonvolatile memory device configured to store logical-to-physical address mapping information, and an unmap filter including a plurality of unmap bits; and a memory controller configured to receive an unmap command and logical addresses corresponding to the unmap command from a host, and control the nonvolatile memory device in response to the unmap command. The memory controller may be configured to: set a state of at least one unmap bit corresponding to the logical addresses among the plurality of unmap bits to an unmapped state, and store the set unmap bit to the nonvolatile memory device; and modify a state of logical-physical address mapping information about a logical address that does not correspond to the unmap bit among the logical addresses to an unmapped state, and store the modified logical-physical address mapping information to the nonvolatile memory device.

An embodiment of the present disclosure may provide for a memory system including: a nonvolatile memory device configured to store a plurality of logical-to-physical address mapping information, and a plurality of unmap bits respectively representing mapping statuses of groups of ones among the plurality of logical-to-physical address mapping information; and a controller configured to control, according to one or more input logical addresses provided along with an unmap command, the nonvolatile memory device to: read, change, and re-store values of one or more unmap bits corresponding to ones among the groups fully matching ones among the input logical addresses, and read, change, and re-store mapping statuses of one or more logical-to-physical address mapping information corresponding to remaining ones among the input logical addresses.

BRIEF DESCRIPTION OF THE DRAWINGS

FIGS. 6 and 7 are diagrams illustrating a method of managing logical-to-physical address mapping information in accordance with an embodiment of the present disclosure.

FIG. 8 is a diagram illustrating a method of managing logical-to-physical address mapping information in accordance with an embodiment of the present disclosure.

FIG. 9 is a diagram illustrating a method of unmapping logical-to-physical address mapping information in accordance with an embodiment of the present disclosure.

DETAILED DESCRIPTION

Figure 1:
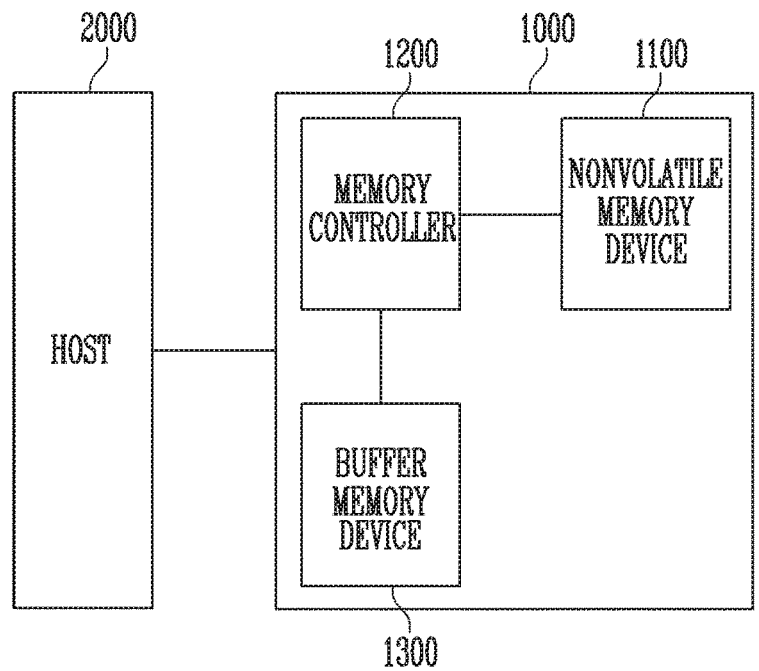
FIG. 1 is a diagram illustrating a memory system in accordance with an embodiment of the present disclosure.

Example embodiments will now be described more fully with reference to the accompanying drawings; however, aspects of the present disclosure may be embodied in different forms and should not be construed as limited to the embodiments set forth herein. Rather, these embodiments are provided so that this disclosure will be thorough and complete, and will fully convey the scope of the example embodiments to those skilled in the art. It is further noted that reference to "an embodiment" does not necessarily mean only one embodiment, and different references to "an embodiment" are not necessarily to the same embodiment(s).

In the drawing figures, dimensions may be exaggerated for clarity of illustration. It will be understood that when an element is referred to as being "between" two elements, it can be the only element between the two elements, or one or more intervening elements may also be present.

Embodiments are described with reference to the accompanying drawings, and in some instances with reference to cross-sectional illustrations that are schematic illustrations of embodiments (and intermediate structures). As such, variations from the shapes of illustrated structures as a result, for example, of manufacturing techniques and/or tolerances, are to be expected. Thus, embodiments should not be construed as limited to the particular shapes or regions of structures illustrated herein but may include deviations in shapes that result, for example, from manufacturing. In the drawings, lengths and sizes of layers and regions of structures may be exaggerated for clarity. Like reference numerals in the drawings denote like elements.

Terms such as "first" and "second" may be used to describe various components, but they do not limit the various components. Those terms are only used for the purpose of differentiating a component from other components. For example, a first component may be referred to as a second component, and a second component may be referred to as a first component and so forth without departing from the spirit and scope of the present disclosure. Furthermore, "and/or" may include any one of or a combination of the components mentioned.

Furthermore, a singular form may include a plural form and vice versa, unless stated or the context indicates otherwise. Furthermore, "include/comprise" or "including/comprising" used in the specification is intended as an open-ended transition. Each such transition represents the inclusion of the one or more components, steps, operations, and elements identified but does not preclude further addition.

Furthermore, unless defined otherwise, all the terms used in this specification including technical and scientific terms have the same meanings as would be generally understood by those skilled in the related art. The terms defined in generally used dictionaries should be construed as having the same meanings as would be construed in the context of the related art, and unless clearly defined otherwise in this specification, should not be construed as having idealistic or overly formal meanings.

It is also noted that in this specification, "connected/coupled" refers to one component not only directly coupling another component but also indirectly coupling another component through an intermediate component. On the other hand, "directly connected/directly coupled" refers to one component directly coupling another component without an intermediate component.

FIG. 1 is a diagram illustrating a memory system 1000 in accordance with an embodiment of the present disclosure.

Referring to FIG. 1, the memory system 1000 may include a nonvolatile memory device 1100 which retains stored data even when power is turned off, a buffer memory device 1300 that temporarily stores data, and a memory controller 1200 that controls the nonvolatile memory device 1100 and the buffer memory device 1300 under control of a host 2000.

The host interface 2000 may communicate with the memory system 1000 using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The memory controller 1200 may control the overall operation of the memory system 1000 and data exchange between the host 2000 and the nonvolatile memory device 1100. For instance, the memory controller 1200 may control the nonvolatile memory device 1100 to program or read data in response to a request of the host 2000. Furthermore, the memory controller 1200 may control the nonvolatile memory device 1100 such that information is stored in main memory blocks and sub-memory blocks included in the nonvolatile memory device 1100, and a program operation is performed on the main memory blocks or the sub-memory blocks depending on the amount of data loaded for the program operation. In an embodiment, the nonvolatile memory device 1100 may include a flash memory.

The memory controller 1200 may control data exchange between the host 2000 and the buffer memory device 1300 or temporarily store system data for controlling the nonvolatile memory device 1100 in the buffer memory device 1300. The buffer memory device 1300 may be used as an operation memory, a cache memory, or a buffer memory of the memory controller 1200. The buffer memory device 1300 may store codes and commands to be executed by the memory controller 1200. The buffer memory device 1300 may store data to be processed by the memory controller 1200.

The memory controller 1200 may temporarily store data input from the host 2000 in the buffer memory device 1300, and then transmit the data temporarily stored in the buffer memory device 1300 to the nonvolatile memory device 1100 and store it therein. Furthermore, the memory controller 1200 may receive data and a logical address from the host 2000 and convert the logical address to a physical address indicating an area in which the data is to be actually stored in the nonvolatile memory device 1100. The memory controller 1200 may store, in the buffer memory device 1300, a logical-to-physical address mapping table indicating mapping relationship between logical addresses and physical addresses.

In an embodiment, the buffer memory device 1300 may include a double data rate synchronous dynamic random access memory (DDR SDRAM), a DDR4 SDRAM, a low power double data rate4 (LPDDR4) SDRAM, a graphics double data rate (DDDR) SDRAM, a low power DDR (LPDDR), or a rambus dynamic random access memory (RDRAM).

Although FIG. 1 shows the memory system 1000 including the buffer memory device 1300, the present disclosure is not limited thereto. That is, in a different embodiment, the memory system 1000 may not include the buffer memory device 1300.

Figure 2:
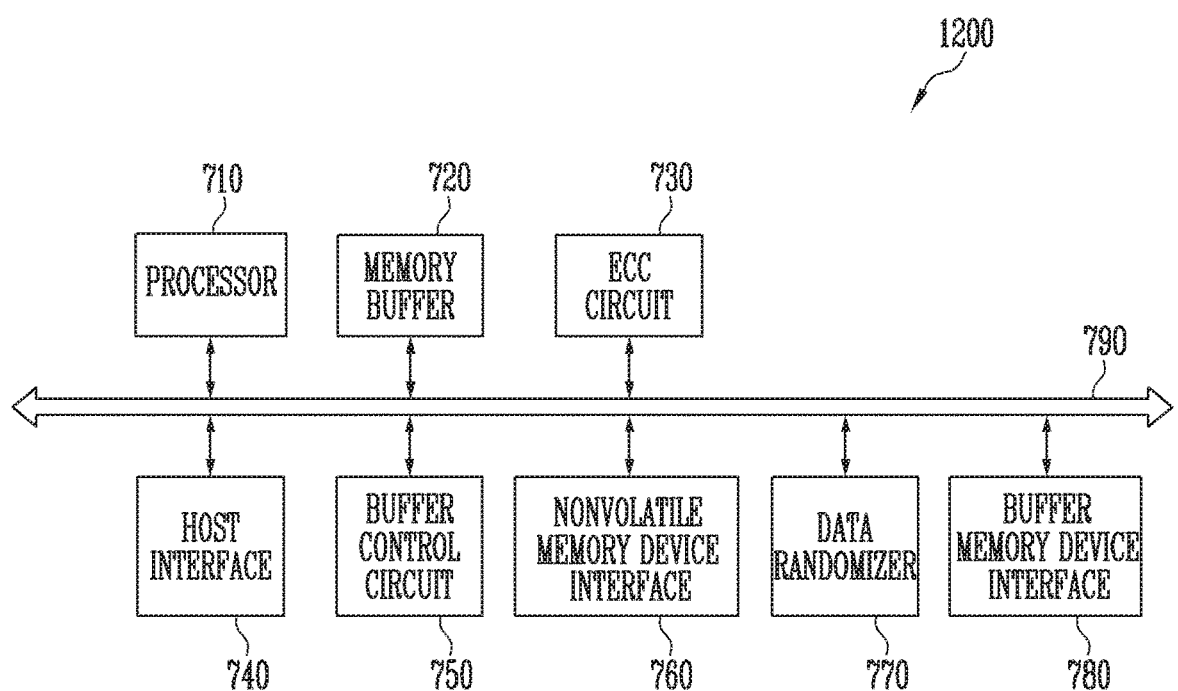
FIG. 2 is a diagram illustrating the memory controller of FIG. 1.

FIG. 2 is a diagram illustrating the memory controller 1200 of FIG. 1.

Referring to FIG. 2, the memory controller 1200 may include a processor 710, a memory buffer 720, an error correction code (ECC) circuit 730, a host interface 740, a buffer control circuit 750, a nonvolatile memory device interface 760, a data randomizer 770, a buffer memory device interface 780, and a bus 790.

The bus 790 may provide a channel between components of the memory controller 1200.

The processor 710 may control the overall operation of the memory controller 1200 and perform logical operations. The processor 710 may communicate with the external host 2000 through the host interface 740, and communicate with the nonvolatile memory device 1100 through the nonvolatile memory device interface 760. Furthermore, the processor 710 may communicate with the buffer memory device 1300 through the buffer memory device interface 780. The processor 710 may control the memory buffer 720 through the buffer control circuit 750. The processor 710 may use the memory buffer 720 as an operation memory, a cache memory, or a buffer memory to control the operation of the memory system 1000.

The processor 710 may queue a plurality of commands input from the host 2000. This operation is called a multi-queue operation. The processor 710 may successively transmit the queued commands to the memory device 1100.

The memory buffer 720 may be used as an operation memory, a cache memory, or a buffer memory of the processor 710. The memory buffer 720 may store codes and commands to be executed by the processor 710. The memory buffer 720 may store data to be processed by the processor 710. The memory buffer 720 may include a static RAM (SRAM) or a dynamic RAM (DRAM).

The ECC circuit 730 may perform error correction. The ECC circuit 730 may perform ECC encoding based on data to be written in the nonvolatile memory device 1100 through the nonvolatile memory device interface 760. ECC encoded data may be transmitted to the nonvolatile memory device 1100 through the nonvolatile memory device interface 760. The ECC circuit 730 may perform ECC decoding for data received from the nonvolatile memory device 1100 through the nonvolatile memory device interface 760. For example, the ECC circuit 730 may be included in the nonvolatile memory device interface 760 as a component of the nonvolatile memory device interface 760.

The host interface 740 may communicate with the external host 2000 under control of the processor 710. The host interface 740 may perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multimedia card (MMC), an embedded MMC (eMMC), a dual in-line memory module (DIMM), a registered DIMM (RDIMM), and a load reduced DIMM (LRDIMM).

The buffer control circuit 750 may control the memory buffer 720 under control of the processor 710.

The nonvolatile memory device interface 760 may communicate with the nonvolatile memory device 1100 under control of the processor 710. The nonvolatile memory device interface 760 may communicate a command, an address, and data with the nonvolatile memory device 1100 through a channel.

Although FIG. 2 shows that the memory controller 1200 includes the memory buffer 720 and the buffer control circuit 750, the present disclosure is not limited thereto. That is, in another embodiment, the memory controller 1200 may include neither the memory buffer 720 nor the buffer control circuit 750.

For instance, the processor 710 may use codes to control the operation of the memory controller 1200. The processor 710 may load codes from a nonvolatile memory device (e.g., a read only memory) provided in the memory controller 1200. Alternatively, the processor 710 may load codes from the nonvolatile memory device 1100 through the nonvolatile memory device interface 760.

The data randomizer 770 may randomize data or de-randomize the randomized data. The data randomizer 770 may perform a data randomization operation for data to be written in the nonvolatile memory device 1100 through the nonvolatile memory device interface 760. Randomized data may be transmitted to the nonvolatile memory device 1100 through the nonvolatile memory device interface 760. The data randomizer 770 may perform a data de-randomization operation for data received from the nonvolatile memory device 1100 through the nonvolatile memory device interface 760. For example, the data randomizer 770 may be included in the nonvolatile memory device interface 760 as a component of the nonvolatile memory device interface 760.

For example, the bus 790 of the memory controller 1200 may be divided into a control bus and a data bus. The data bus may transmit data in the memory controller 1200. The control bus may transmit control information such as a command and an address in the memory controller 1200. The data bus and the control bus may be separated from each other and may neither interfere with each other nor affect each other. The data bus may be coupled to the host interface 740, the buffer controller 750, the ECC circuit 730, the nonvolatile memory device interface 760, and the buffer memory device interface 780. The control bus may be coupled to the host interface 740, the processor 710, the buffer control circuit 750, the nonvolatile memory device interface 760, and the buffer memory device interface 780. However, in another embodiment of the present disclosure, the memory controller 1200 may not include the buffer memory device interface 780.

The buffer memory device interface 750 may communicate with the buffer memory device 1300 under control of the processor 710. The buffer memory device interface 750 may communicate a command, an address, and data with the buffer memory device 1300 through a channel.

Figure 3:
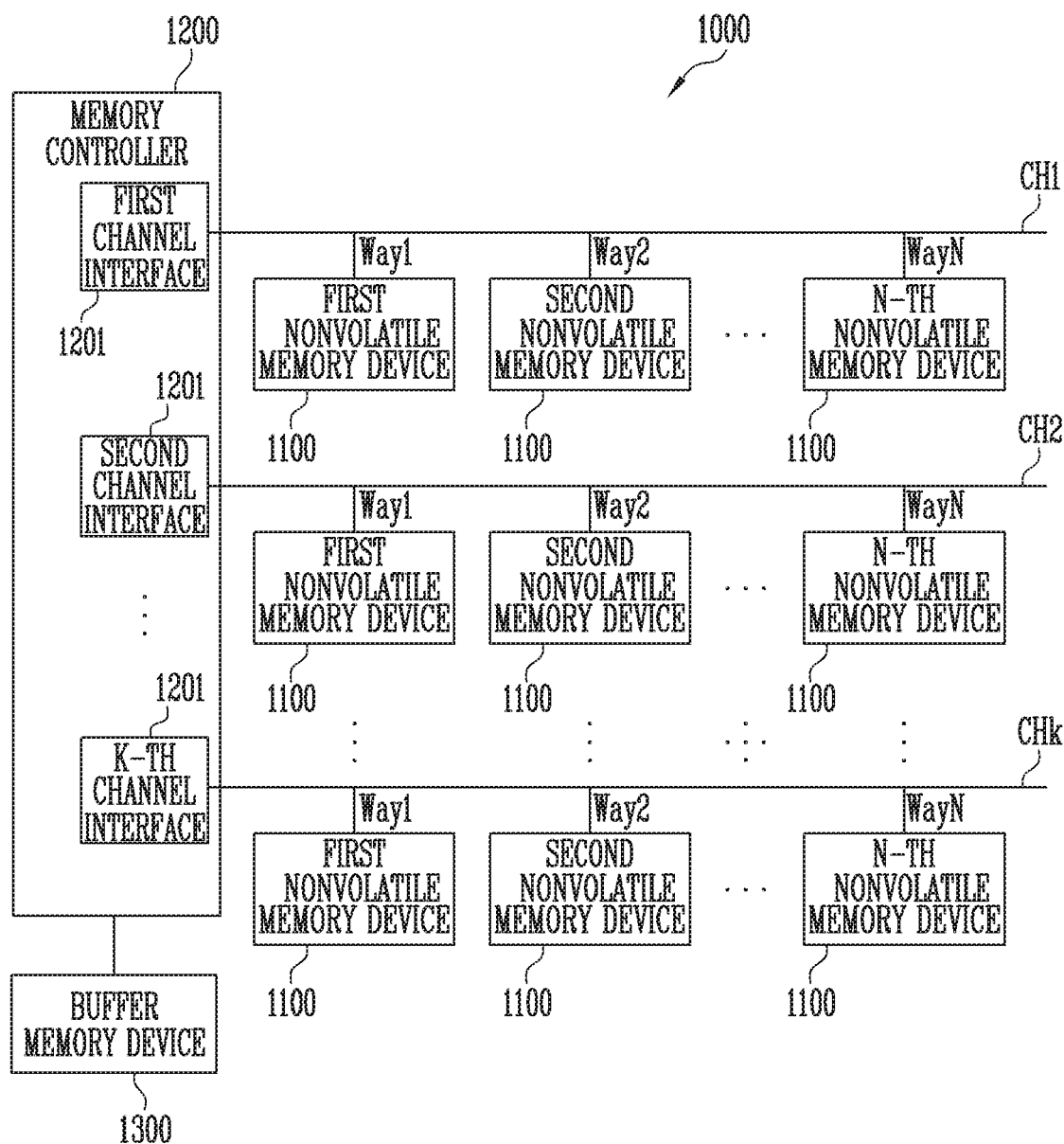
FIG. 3 is a diagram illustrating a memory system in accordance with an embodiment of the present disclosure.

FIG. 3 is a diagram illustrating a memory system 1000 in accordance with an embodiment of the present disclosure. FIG. 3 illustrates the memory system 1000 including a memory controller 1200, and a plurality of nonvolatile memory devices 1100 coupled to the memory controller 1200 through a plurality of channels CH1 to CHk.

Referring to FIG. 3, the memory controller 1200 may communicate with the nonvolatile memory devices 1100 through the channels CH1 to CHk. The memory controller 1200 may include a plurality of channel interfaces 1201. Each of the channels CH1 to CHk may be coupled to a corresponding one of the channel interfaces 1201. For example, the first channel CH1 may be coupled the first channel interface 1201, the second channel CH2 may be coupled to the second channel interface 1201, and the k-th channel CHk may be coupled to the k-th channel interface 1201. Each of the channels CH1 to CHk may be coupled to one or more nonvolatile memory devices 1100. The nonvolatile memory devices 1100 that are coupled to different channels may operate independently. For example, the nonvolatile memory devices 1100 coupled to the first channel CH1 may operate independently from the nonvolatile memory devices 1100 coupled to the second channel CH2. For instance, the memory controller 1200 may communicate data or a command through the first channel CH1 with the nonvolatile memory devices 1100 coupled to the first channel CH1 and, in parallel, communicate data or a command through the second channel CH2 with the nonvolatile memory devices 1100 coupled to the second channel CH2.

Each of the channels CH1 to CHk may be coupled to a plurality of nonvolatile memory devices 1100. The nonvolatile memory devices 1100 coupled to each channel may form respective different ways. For example, N nonvolatile memory devices 1100 may be coupled to each channel, and each nonvolatile memory device 1100 may form a different way. For example, first to N-th nonvolatile memory devices 1100 may be coupled to the first channel CH1. The first nonvolatile memory device 1100 may form a first way Way1, the second nonvolatile memory device 1100 may form a second way Way2, and the N-th nonvolatile memory device 1100 may form an N-th way WayN. Alternatively, unlike the example of FIG. 2, two or more nonvolatile memory devices 1100 may form a single way.

The first to N-th nonvolatile memory devices 1100 coupled to CH1 may successively communicate data or a command with the memory controller 1200, rather than simultaneously communicating in parallel with the memory controller 1200, because the first to N-th nonvolatile memory devices 1100 share CH1. In other words, while the memory controller 1200 sends, through CH1, data to the first nonvolatile memory device 1100 forming Way1 of CH1, each of the second to N-th nonvolatile memory device 1100 forming Way2 to WayN of CH1 cannot communicate data or a command with the memory controller 1200 through CH1. In other words, while any one of the first to N-th nonvolatile memory devices 1100 sharing CH1 occupies CH1, the other nonvolatile memory devices 1100 coupled to CH1 cannot use CH1.

The first nonvolatile memory device 1100 forming Way1 of CH1 and the first nonvolatile memory device 1100 forming Way1 of CH2 may independently communicate with the memory controller 1200. In other words, while the memory controller 1200 communicates data with the first nonvolatile memory device 1100 forming Way1 of CH1 through CH1 and the first channel interface 1201, the memory controller 1200 may simultaneously communicate data with the first nonvolatile memory device 1100 forming Way1 of CH2 through CH2 and the second channel interface 1201.

Figure 4:
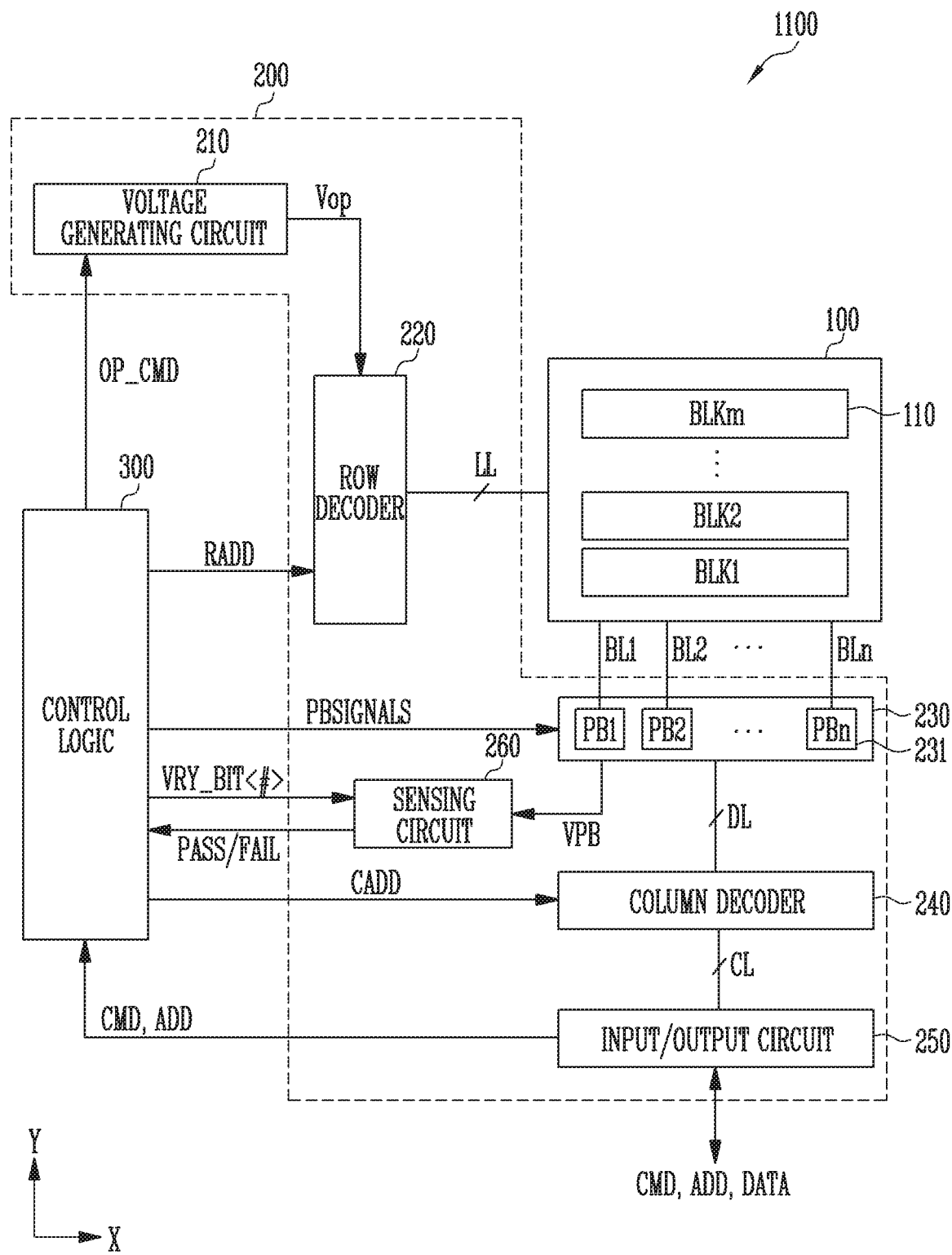
FIG. 4 is a diagram illustrating the nonvolatile memory device of FIG. 1.

FIG. 4 is a diagram illustrating the nonvolatile memory device 1100 of FIG. 1.

Referring to FIG. 4, the nonvolatile memory device 1100 may include a memory cell array 100 that stores data. The nonvolatile memory device 1100 may include peripheral circuits 200 that performs a program operation for storing data in the memory cell array 100, a read operation for outputting the stored data, and an erase operation for erasing the stored data. The nonvolatile memory device 1100 may include a control logic 300 that controls the peripheral circuits 200 under control of the memory controller (1200 of FIG. 1).

The memory cell array 100 may include a plurality of memory blocks BLK1 to BLKm 110 (where m is a positive integer). Local lines LL and bit lines BL1 to BLn (where n is a positive integer) may be coupled to each of the memory blocks BLK1 to BLKm 110. For example, the local lines LL may include a first select line, a second select line, and a plurality of word lines arranged between the first and second select lines. Furthermore, the local lines LL may include dummy lines arranged between the first select line and the word lines and between the second select line and the word lines. The first select line may be a source select line, and the second select line may be a drain select line. For example, the local lines LL may include word lines, drain select lines, source select lines, and source lines. The local lines LL may further include dummy lines. In addition, the local lines LL may further include pipelines. The local lines LL may be coupled to each of the memory blocks BLK1 to BLKm 110. The bit lines BL1 to BLn may be coupled in common to the memory blocks BLK1 to BLKm 110. The memory blocks BLK1 to BLKm 110 may be embodied in a two-dimensional (2D) or three-dimensional (3D) structure. For example, in the memory blocks 110 having a two-dimensional structure, the memory cells may be arranged in a direction parallel to a substrate. For example, in the memory blocks 110 having a three-dimensional structure, the memory cells may be stacked in a direction perpendicular to the substrate.

The peripheral circuits 200 may perform program, read, and erase operations on a selected memory block 110 under control of the control logic 300. For example, under control of the control logic 300, the peripheral circuits 200 may supply a verify voltage and pass voltages to the first select line, the second select line, and the word lines, selectively discharge the first select line, the second select line, and the word lines, and verify memory cells coupled to a selected word line among the word lines. For instance, the peripheral circuits 200 may include a voltage generating circuit 210, a row decoder 220, a page buffer group 230, a column decoder 240, an input/output circuit 250, and a sensing circuit 260.

The voltage generating circuit 210 may generate various operating voltages Vop to be used for the program, read, and erase operations in response to an operating signal OP_CMD. Furthermore, the voltage generating circuit 210 may selectively discharge the local lines LL in response to an operating signal OP_CMD. For example, the voltage generating circuit 210 may generate a program voltage, a verify voltage, pass voltages, a turn-on voltage, a read voltage, an erase voltage, a source line voltage, etc. under control of the control logic 300.

Figure 5:
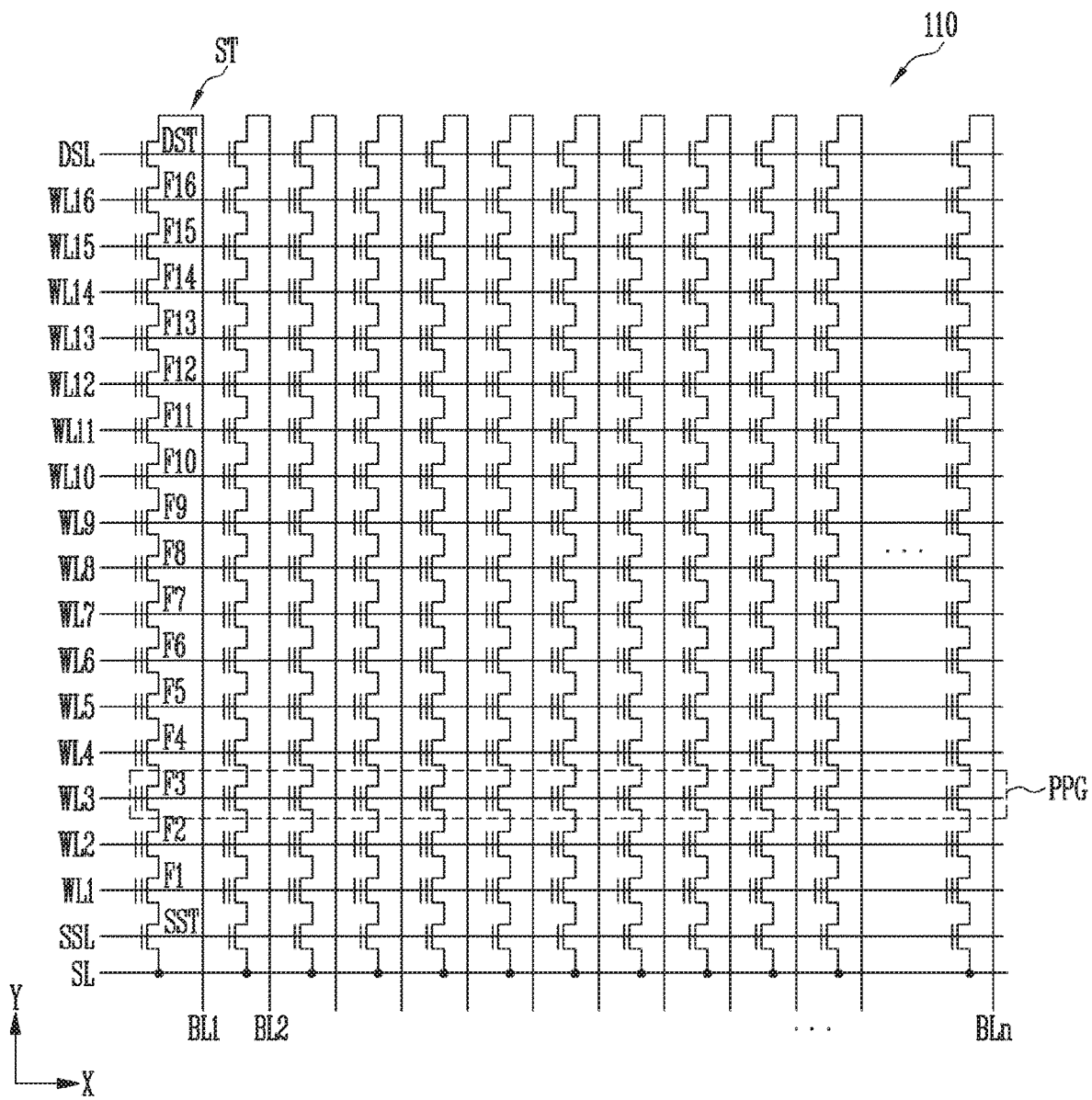
FIG. 5 is a diagram illustrating a memory block of FIG. 4.

The row decoder 220 may transmit operating voltages Vop to local lines WL coupled to a selected memory block 110, as shown in FIG. 5, in response to a row address RADD.

The page buffer group 230 may include a plurality of page buffers PB1 to PBn 231 coupled to the bit lines BL1 to BLn. The page buffers PB1 to PBn 231 may operate in response to page buffer control signals PBSIGNALS. For instance, the page buffers PB1 to PBn 231 may temporarily store data received through the bit lines BL1 to BLn or sense voltages or currents of the bit lines BL1 to BLn during a read or verify operation.

The column decoder 240 may transmit data between the input/output circuit 250 and the page buffer group 230 in response to a column address CADD. For example, the column decoder 240 may exchange data with the page buffers 231 through data lines DL or exchange data with the input/output circuit 250 through column lines CL.

The input/output circuit 250 may transmit a command CMD or an address ADD received from the memory controller 1200 (shown in FIG. 1) to the control logic 300, or exchange data DATA with the column decoder 240.

During the read or verify operation, the sensing circuit 260 may generate a reference current in response to an enable bit VRY_BIT<#>, and may compare a sensing voltage VPB received from the page buffer group 230 with a reference voltage generated by the reference current and output a pass signal PASS or a fail signal FAIL.

The control logic 300 may output an operating signal OP_CMD, a row address RADD, page buffer control signals PBSIGNALS, and an enable bit VRY_BIT<#> in response to a command CMD and an address ADD and thus control the peripheral circuits 200. In addition, the control logic 300 may determine whether target memory cells have passed or failed a verify operation in response to a pass or fail signal PASS or FAIL.

In the operation of the nonvolatile memory device 1100, each memory block 110 may be the basic unit of an erase operation. In other words, a plurality of memory cells included in each memory block 110 may be simultaneously erased rather than being selectively erased.

FIG. 5 is a diagram illustrating a memory block 110 of FIG. 4.

Referring to FIG. 5, in the memory block 110, a plurality of word lines (WL1 to WL16 in the illustrated embodiment) arranged parallel to each other may be coupled between a first select line and a second select line. The first select line may be a source select line SSL, and the second select line may be a drain select line DSL. In more detail, the memory block 110 may include a plurality of strings ST coupled between the bit lines BL1 to BLn and the source line SL. The bit lines BL1 to BLn may be respectively coupled to the strings ST, and the source lines SL may be coupled in common to the strings ST. The strings ST may have the same configuration; therefore, the string ST that is coupled to the first bit line BL1 will be described in detail by way of example.

The string ST may include a source select transistor SST, a plurality of memory cells F1 to F16, and a drain select transistor DST which are coupled in series to each other between the source line SL and the first bit line BL1. At least one source select transistor SST and at least one drain select transistor DST may be included in each string ST, and a larger number of memory cells than the number of memory cells F1 to F16 shown in the drawing may be included in each string ST.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of the source select transistors SST included in different strings ST may be coupled to the source select line SSL, gates of the drain select transistors DST may be coupled to the drain select line DSL, and gates of the memory cells F1 to F16 may be coupled to the plurality of word lines WL1 to WL16. Among the memory cells included in different strings ST, a group of memory cells coupled to each word line may be referred to as a physical page PPG. Therefore, the number of physical pages PPG included in the memory block 110 may correspond to the number of word lines WL1 to WL16.

Each memory cell may store 1-bit data. This memory cell is typically called a single level cell SLC. In this case, each physical page PPG may store data of a single logical page LPG. Data of each logical page LPG may include data bits corresponding to the number of cells included in a single physical page PPG. Each memory cell may store 2- or more-bit data. This memory cell is typically called a multilevel cell MLC. In this case, each physical page PPG may store data of two or more logical pages LPG.

When the memory cell stores 2-bit data, each physical page PPG may include two pages PG. Here, each physical page PG may store single logical page (LPG) data. Each memory cell may have any one of a plurality of threshold voltages depending on data. A plurality of pages PG included in each physical page PPG may be expressed by a difference in threshold voltage.

A plurality of memory cells included in each physical page PPG may be simultaneously programmed. In other words, the nonvolatile memory device 1100 may perform a program operation on a physical page (PPG) basis. A plurality of memory cells included in each memory block may be simultaneously erased. In other words, the nonvolatile memory device 1100 may perform an erase operation on a memory block basis. For example, to update some data stored in one memory block 110, the entire data stored in the memory block 110 may be read, data needed to be updated among the entire data may be changed, and then the entire data may be programmed to another memory block 110. The reason for this is because, in the case where each memory block 110 is the basic unit of the erase operation of the operation of the nonvolatile memory device 1100, it is impossible to erase only some of the data stored in the memory block 110 and program new data thereto again.

FIGS. 6 and 7 are diagrams illustrating a method of managing logical-to-physical address mapping information in accordance with an embodiment of the present disclosure.

Referring to FIG. 6, the memory system 1000 may receive a write command, write data, and a logical address from the host 2000. The memory system 1000 may allocate, in response to the write command, a physical storage region, i.e., a memory block 110 or a page, of the nonvolatile memory device 1100 to store the write data. In other words, the memory system 1000 may map a physical address corresponding to the logical address, in response to the write command. Here, the physical address may be an address corresponding to the physical storage region of the nonvolatile memory device 1100 to store the write data received from the host 2000.

The memory system 1000 may store mapping information between the logical address and the physical address, i.e., the logical-to-physical address mapping information, to the memory block 110 of the nonvolatile memory device 1100. The memory block 110 that stores the logical-to-physical address mapping information may be referred to as a system block.

The memory system 1000 may receive a read command and a logical address from the host 2000. The memory system 1000 may check a physical address corresponding to the logical address from the logical-to-physical address mapping information stored in the nonvolatile memory device 1100 in response to the read command, read data stored in a memory region corresponding to the physical address, and output the data to the host 2000.

For instance, the memory system 1000 may store, to the nonvolatile memory device 1100, logical-to-physical address mapping information about first to sixteenth logical addresses LBA1 to LBA16 received from the host 2000 in other words, the memory system 1000 may store the logical-to-physical address mapping information to a logical-to-physical address mapping information storing area 800. The logical-to-physical address mapping information storing area 800 may be included in the memory cell array 100 of the nonvolatile memory device 1100.

Logical-to-physical address mapping information corresponding to the first to fourth logical addresses LBA1 to LBA4 may be stored to a first mapping information region 801 of the logical-to-physical address mapping information storing area 800. Here, first to fourth sections of the first mapping information region 801 may respectively store the logical-to-physical address mapping information about the first to fourth logical addresses LBA1 to LBA4.

Logical-to-physical address mapping information corresponding to the fifth to eighth logical addresses LBA5 to LBA8 may be stored to a second mapping information region 802 of the logical-to-physical address mapping information storing area 800. Here, first to fourth sections of the second mapping information region 802 may respectively store the logical-to-physical address mapping information about the fifth to eighth logical addresses LBA5 to LBA8.

Likewise, logical-to-physical address mapping information corresponding to the ninth to twelfth logical addresses LBA9 to LBA12 may be stored to a third mapping information region 803 of the logical-to-physical address mapping information storing area 800. Here, first to fourth sections of the third mapping information region 803 may respectively store the logical-to-physical address mapping information about the ninth to twelfth logical addresses LBA9 to LBA12.

Furthermore, logical-to-physical address mapping information corresponding to the thirteenth to sixteenth logical addresses LBA13 to LBA16 may be stored to a fourth mapping information region 804 of the logical-to-physical address mapping information storing area 800. Here, first to fourth sections of the fourth mapping information region 804 may respectively store the logical-to-physical address mapping information about the thirteenth to sixteenth logical addresses LBA13 to LBA16.

Referring to FIG. 7, the memory system 1000 may receive an unmap command from the host 2000. For example, when the memory system 1000 receives an unmap command corresponding to the third to tenth logical addresses LBA3 to LBA10, the memory system 1000 may perform an unmap operation on the third and fourth sections of the first mapping information region 801, the first to fourth sections of the second mapping information region 802, and the first and second sections of the third mapping information region 803.

During the unmap operation, the memory system 1000 may perform a read-modify-write operation of reading stored logical-to-physical address mapping information, modifying the read logical-to-physical address mapping information into new logical-to-physical address mapping information including information about a logical address to be set to an unmapped state, and rewriting the new logical-to-physical address mapping information.

In the foregoing example, the memory controller 1200 may read, in response to the unmap command, the entirety or some of the logical-to-physical address mapping information stored in the first to fourth mapping information regions 801 to 804 of the nonvolatile memory device 1100.

Subsequently, the memory controller 1200 may modify, among the logical-to-physical address mapping information read from the nonvolatile memory device 1100, logical-to-physical address mapping information corresponding to a logical address region corresponding to the unmap command, i.e., logical-to-physical address mapping information corresponding to the third to tenth logical addresses LBA3 to LBA10, into an unmapped state. In other words, the memory controller 1200 may modify the state of the logical-to-physical address mapping information of the third and fourth sections of the first mapping information region 801, the first to fourth sections of the second mapping information region 802, and the first and second sections of the third mapping information region 803, corresponding to the third to tenth logical addresses LBA3 to LBA10, into the unmapped state.

The memory controller 1200 may temporarily store the logical-to-physical address mapping information read from the nonvolatile memory device 1100, to the memory buffer 720 or the buffer memory device 1300. The memory buffer 720 and the buffer memory device 1300 may be collectively called a buffer memory.

Furthermore, the memory controller 1200 may modify logical-to-physical address mapping information stored in the buffer memory, based on the unmap command and a logical address corresponding thereto.

Thereafter, the memory controller 1200 may rewrite the modified logical-to-physical address mapping information that is temporarily stored in the buffer memory, to the nonvolatile memory device 1100.

The memory system 1000 may perform, in response to an unmap command, an operation of unmapping a physical address for a logical address region corresponding to the unmap command.

For example, the unmap command may be an erase command. In other words, when data stored in a certain logical address region is to be erased, the host 2000 may input an unmap command corresponding to the associated logical address region to the memory system 1000. Furthermore, when the memory system 1000 receives an unmap command corresponding to a certain logical address region, the memory system 1000 may erase data stored in a physical address region corresponding to an associated logical address. In addition, when the memory system 1000 receives an unmap command corresponding to a certain logical address region, the memory system 1000 may erase mapping information about a corresponding logical address and a physical address corresponding to the logical address. In other words, when the memory system 1000 receives an unmap command corresponding to a certain logical address region, the memory system 1000 may remove mapping relationship of a corresponding logical address with an associated physical address. Thereafter, when a write command corresponding to the logical address is input, the memory system 1000 may map a new physical address to the corresponding logical address.

As described above, the unmap operation to the logical-to-physical address mapping information that is performed in response to an unmap command may be accompanied by a read-modify-write operation in the memory system 1000.

If read-modify-write operations are frequently performed, the performance of the memory system 1000 may deteriorate.

FIG. 8 is a diagram illustrating a method of managing logical-to-physical address mapping information in accordance with an embodiment of the present disclosure.

Referring to FIG. 8, the memory system 1000 may include an unmap filter storing area 900. For example, the unmap filter storing area 900 for storing an unmap filter may include first to eighth unmap bit storing areas 901 to 908. The first to eighth unmap bit storing areas 901 to 908 may respectively store first to eighth unmap bits U1 to U8.

Here, the first and second logical addresses LBA1 to LBA2 may correspond to the first unmap bit U1, the third and fourth logical addresses LBA3 to LBA4 may correspond to the second unmap bit U2, the fifth and sixth logical addresses LBA5 to LBA6 may correspond to the third unmap bit U3, and the seventh and eighth logical addresses LBA7 to LBA8 may correspond to the fourth unmap bit U4. Furthermore, the ninth and tenth logical addresses LBA9 to LBA10 may correspond to the fifth unmap bit U5, the eleventh and twelfth logical addresses LBA11 to LBA12 may correspond to the sixth unmap bit U6, the thirteenth and fourteenth logical addresses LBA13 to LBA14 may correspond to the seventh unmap bit U7, and the fifteenth and sixteenth logical addresses LBA15 to LBA16 may correspond to the eighth unmap bit U8.

A plurality of logical addresses may correspond to a single unmap bit. Alternatively, a single logical address may correspond to a single unmap bit. Each of the unmap bits U1 to U8 is described herein to be formed of one bit. The unmap filter may be stored in the nonvolatile memory device 1100. In other words, the unmap filter storing area 900 may be included in the nonvolatile memory device 1100, in detail, in the memory cell array 100 of the nonvolatile memory device 1100. For example, when each of the unmap bits U1 to U8 is formed of one bit, each of the unmap bit storing areas 901 to 908 may correspond to a single memory cell. Alternatively, the respective unmap bits U1 to U8 may be formed of two or more bits.

For instance, the first unmap bit U1 may correspond to the first and second sections of the first mapping information region 801. The second unmap bit U2 may correspond to the third and fourth sections of the first mapping information region 801. The third unmap bit U3 may correspond to the first and second sections of the second mapping information region 802. The fourth unmap bit U4 may correspond to the third and fourth sections of the second mapping information region 802. Furthermore, the fifth unmap bit U5 may correspond to the first and second sections of the third mapping information region 803. The sixth unmap bit U6 may correspond to the third and fourth sections of the third mapping information region 803. The seventh unmap bit U7 may correspond to the first and second sections of the fourth mapping information region 804. The eighth unmap bit U8 may correspond to the third and fourth sections of the fourth mapping information region 804. As described above, the respective sections of the first to fourth mapping information regions 801 to 804 may store the logical-to-physical address mapping information.

For example, when each of the first to sixteenth logical addresses LBA1 to LBA16 is mapped to a physical address, the first to eighth unmap bits U1 to U8 may be modified from the unmapped state to a mapped state. Furthermore, logical-to-physical address mapping information about the first to sixteenth logical addresses LBA1 to LBA16 may be stored in the first to fourth mapping information regions 801 to 804.

The unmap filter may be stored in the nonvolatile memory device 1100. In other words, the unmap filter storing area 900 may be included in the nonvolatile memory device 1100, and more specifically, in the memory cell array 100 of the nonvolatile memory device 1100. For example, the unmap filter may be written to one page of the memory block 110. Furthermore, when the unmap filter is updated, the updated unmap filter may be written to a page different from the page to which the original unmap filter has been written.

FIG. 9 is a diagram illustrating a method of unmapping logical-to-physical address mapping information in accordance with an embodiment of the present disclosure.

Referring to FIG. 9, the memory system 1000 may receive an unmap command corresponding to the third to twelfth logical addresses LBA3 to LBA12 from the host 2000. The memory system 1000 may modify the second to sixth unmap bits U2 to U6 corresponding to the third to twelfth logical addresses LBA3 to LBA12 from the mapped state to an unmapped state, in response to that unmap command. For example, when an unmap bit value is '1', it may refer to a mapped state. When the unmap bit value is '0', it may refer to an unmapped state.

The memory controller 1200 may write the modified second to sixth unmap bits U2 to U6 to a memory block 110 of the nonvolatile memory device 1100. Here, the modified second to sixth unmap bits U2 to U6 may be temporarily stored to the buffer memory. In other words, the memory controller 1200 may write the modified second to sixth unmap bits U2 to U6 to the unmap filter storing area 900 of the nonvolatile memory device 1100. In an embodiment, the memory controller 1200 may read, modify and write the existing unmap bits stored in the unmap filter storing area 900 of the nonvolatile memory device 1100. In an embodiment, the memory controller 1200 may write the modified unmap filter 900 to another memory region of the nonvolatile memory device 1100.

Here, the first to fourth mapping information regions 801 to 804 in which the logical-to-physical address mapping information is originally stored may retain the original logical-to-physical address mapping information without any modification. In other words, the read-modify-write operation may not be performed on the first to fourth mapping information regions 801 to 804. In the foregoing example, the logical-to-physical address mapping information stored in the third and fourth sections of the first mapping information region 801, the first to fourth sections of the second mapping information region 802, and first to fourth sections of the third mapping information region 803, corresponding to the third to twelfth logical addresses LBA3 to LBA12, may be retained without any modification. In other words, the read-modify-write operation may not be performed on the third and fourth sections of the first mapping information region 801, the first to fourth sections of the second mapping information region 802, and first to fourth sections of the third mapping information region 803, in which the logical-to-physical address mapping information corresponding to the third to twelfth logical addresses LBA3 to LBA12 is originally stored.

As described above, when the memory system 1000 performs the read-modify-write operation to an unmap filter stored in the nonvolatile memory device or writing a modified unmap filter to another unmap filter storing area so as to update the unmap filter stored in the unmap filter storing area 900 of the nonvolatile memory device 1100 may be much more efficient than the conventional case where the memory system 1000 performs the read-modify-writing operation to logical-to-physical address mapping information stored in the nonvolatile memory device 1100 so as to update the logical-to-physical address mapping information.

In the nonvolatile memory device 1100, a memory region in which the first to eighth unmap bits U1 to U8 are stored, i.e., the unmap filter storing area 900, may be smaller than a memory region of the first to fourth mapping information regions 801 to 804, i.e., the address mapping information storing area 800. Therefore, the case where the memory system 1000 updates the unmap filter may be more efficient than the case where the memory system 1000 updates the logical-to-physical address mapping information.

Figure 10:
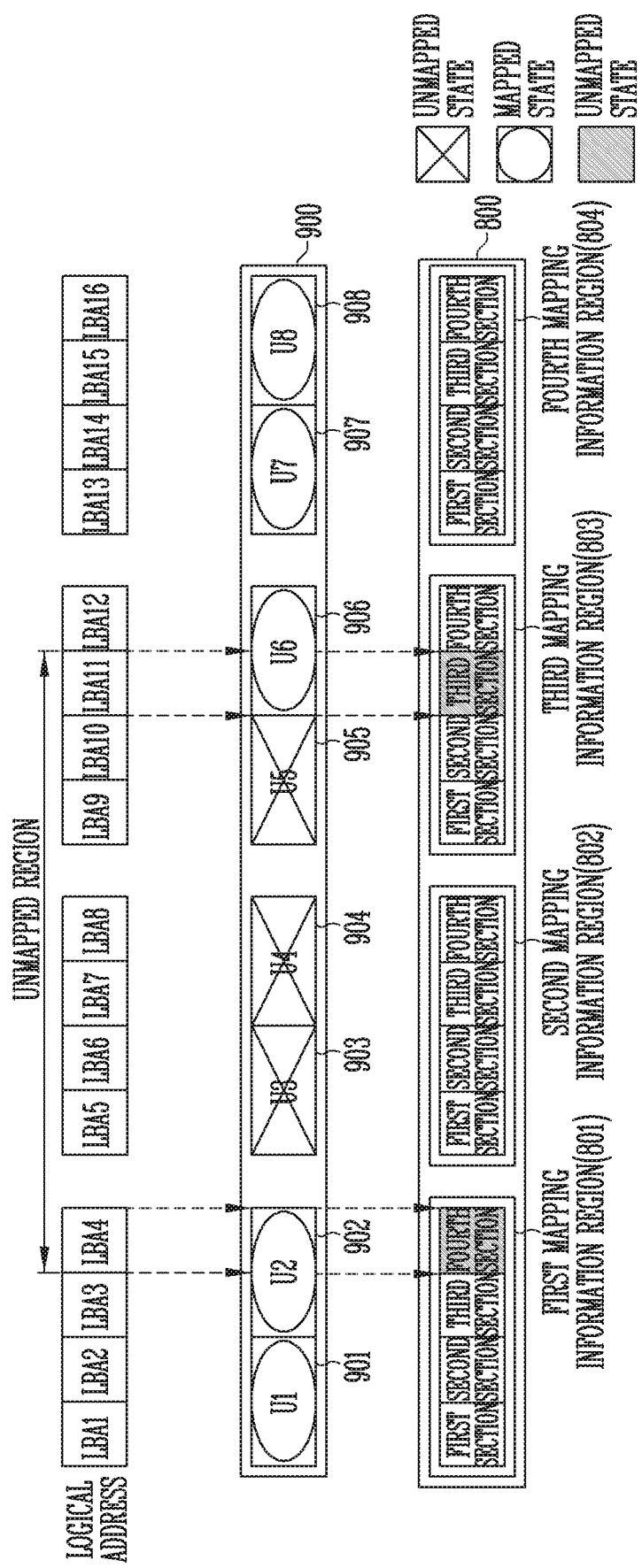
FIG. 10 is a diagram illustrating a method of unmapping logical-to-physical address mapping information in accordance with an embodiment of the present disclosure.

FIG. 10 is a diagram illustrating a method of unmapping logical-to-physical address mapping information in accordance with an embodiment of the present disclosure.

Referring to FIG. 10, the memory system 1000 may receive an unmap command corresponding to the fourth to eleventh logical addresses LBA4 to LBA11 from the host 2000. The memory system 1000 may modify, in response to the unmap command received from the host 2000, the third to fifth unmap bits U3 to U5 corresponding the fifth to tenth logical addresses LBA5 to LBA10 among the fourth to eleventh logical addresses LBA4 to LBA11, from the mapped state to an unmapped state. For example, when an unmap bit value is '1', it may refer to a mapped state. When the unmap bit value is '0', it may refer to an unmapped state.

In an embodiment, the memory controller 1200 may read-modify-write the existing unmap filter stored in the unmap filter storing area 900 of the nonvolatile memory device 1100 to a modified unmap filter 900. That is, the memory controller 1200 may read the existing unmap filter stored in the unmap filter storing area 900 of the nonvolatile memory device 1100 and temporarily store it to the memory buffer 720 or the buffer memory device 1300. In other words, the memory controller 1200 may load the existing unmap filter 900 stored in the unmap filter storing area 900 of the nonvolatile memory device 1100 to the memory buffer 720 or the buffer memory device 1300. The memory controller 1200 may modify the existing unmap filter 900 loaded to the memory buffer 720 or the buffer memory device 1300, based on the logical addresses corresponding to the unmap command, and then rewrite it to the unmap filter storing area 900.

In an embodiment, the memory controller 1200 may write the modified unmap filter to a memory block 110 of the nonvolatile memory device 1100. In other words, the controller 1200 may store the modified unmap filter to a memory region different from the memory region in which the unmap filter has been stored before the unmap filter is modified. In this case, there is no need for the memory system 1000 to perform an operation of reading, from the nonvolatile memory device 1100, the unmap filter that is stored before the modification.

Thereafter, the memory system 1000 may update, in response to the unmap command received from the host 2000, logical-to-physical address mapping information about the fourth and eleventh logical addresses LBA4 and LBA11 that do not correspond to the unmap bits among the fourth to eleventh logical addresses LBA4 to LBA11. In other words, the memory system 1000 may update the logical-to-physical address mapping information of the fourth section of the first mapping information region 801 corresponding to the fourth logical address LBA4 and the third section of the third mapping information region 803 corresponding to the eleventh logical address LBA11. In other words, the memory system 1000 may modify the logical-to-physical address mapping information corresponding to the eleventh logical addresses LBA4 and LBA11 into an unmapped state. For example, the memory system 1000 may perform a read-modify-write operation for the logical-to-physical address mapping information stored in the fourth section of the first mapping information region 801 corresponding to the fourth logical address LBA4 and the third section of the third mapping information region 803 corresponding to the eleventh logical address LBA11, among the existing logical-to-physical address mapping information stored in the nonvolatile memory device 1100.

In the case where a 1-bit unmap bit is allocated to a plurality of logical addresses, if there is need to unmap all of the logical addresses corresponding to the 1-bit unmap bit, the unmap bit is modified from the mapped state to the unmapped state while the logical-to-physical address mapping information corresponding to the logical addresses remain without any modification, as exemplified by the third to fifth unmap bits U3 to U5 allocated for the fifth to tenth logical addresses LBA5 to LBA10 in FIG. 10.

In an embodiment, in the case where a 1-bit unmap bit is allocated to a plurality of logical addresses, if there is need to unmap only some of the plural logical addresses corresponding to the 1-bit unmap bit, the unmap bit may remain mapped while the logical-to-physical address mapping information corresponding to the logical addresses are updated or modified, as exemplified by the second and sixth unmap bits U2 and U6 allocated for the fourth and eleventh logical addresses LBA4 and LBA11 in FIG. 10.

Figure 11:
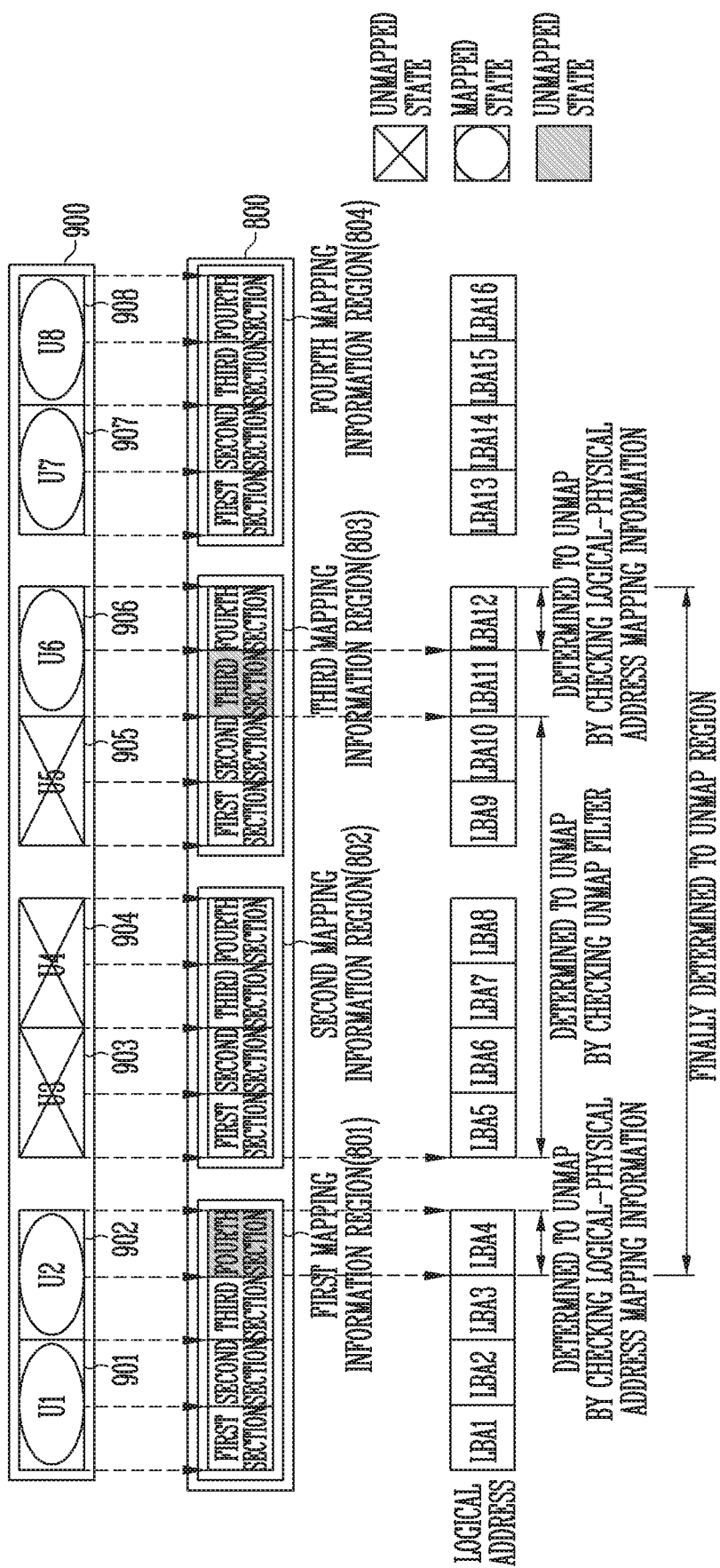
FIG. 11 is a diagram illustrating a method of determining whether a logical address has been unmapped in accordance with an embodiment of the present disclosure.

FIG. 11 is a diagram illustrating a method of determining whether a logical address has been unmapped in accordance with an embodiment of the present disclosure.

Referring to FIG. 11, the memory system 1000 may determine whether a plurality of logical addresses have been mapped or unmapped. For example, the third to fifth unmap bits U3 to U5 of the unmap filter storing area 900 may be in an unmapped state, and the fourth section of the first mapping information region 801 corresponding to the fourth logical address LBA4 and the third section of the third mapping information region 803 corresponding to the eleventh logical address LBA11 in the logical-to-physical address mapping information storing area 800 may be an unmapped state. In other words, among the logical-to-physical address mapping information in the logical-to-physical address mapping information storing area 800, logical-to-physical address mapping information stored in the fourth section of the first mapping information region 801 and in the third section of the third mapping information region 803 corresponding to the fourth and eleventh logical addresses LBA4 and LBA11 respectively may be in the unmapped state.

When there is need to determine whether a plurality of logical addresses are in the mapped or unmapped state, the memory system 1000 may detect that the third to fifth unmap bits U3 to U5 corresponding to the fifth to tenth logical addresses LBA5 to LBA10 are in the unmapped state by checking in the unmap filter unmap filter storing area 900. As a result, the memory system 1000 may determine that the fifth to tenth logical addresses LBA5 to LBA10 are in the unmapped state. Thereafter, the memory system 1000 may detect that the fourth section of the first mapping information region 801 and the third section of the third mapping information region 803 corresponding to the fourth and eleventh logical addresses LBA4 and LBA11 respectively are in the unmapped state by checking the logical-to-physical address mapping information of the address mapping information storing area 800. As a result, the memory system 1000 may determine that the fourth logical address LBA4 and the eleventh logical address LBA11 are in the unmapped state. The memory system 1000 may determine that the fourth to eleventh logical addresses LBA4 to LBA14 are in the unmapped state through the above-described process.

The unmap filter may be stored in one page of the nonvolatile memory device 1100. In other words, the unmap filter storing area 900 may be one physical page PPG of the nonvolatile memory device 1100. Therefore, the operation of checking, by the memory system 1000, whether corresponding logical addresses are in the mapped or unmapped state through the unmap filter may be performed through one read operation. The logical-to-physical address mapping information may be stored in a plurality of pages of the nonvolatile memory device 1100. For example, the memory system 1000 may allocate one or more memory blocks 110 to store the logical-to-physical address mapping information. Therefore, the operation of checking, by the memory system 1000, whether corresponding logical addresses are in the mapped or unmapped state through the logical-to-physical address mapping information stored in the nonvolatile memory device 1100 may be performed a plurality of times through read operations. Consequently, the memory system 1000 may determine whether a plurality of logical addresses are in the mapped or unmapped state through a reduced number of read operations using the unmap filter.

Figure 12:
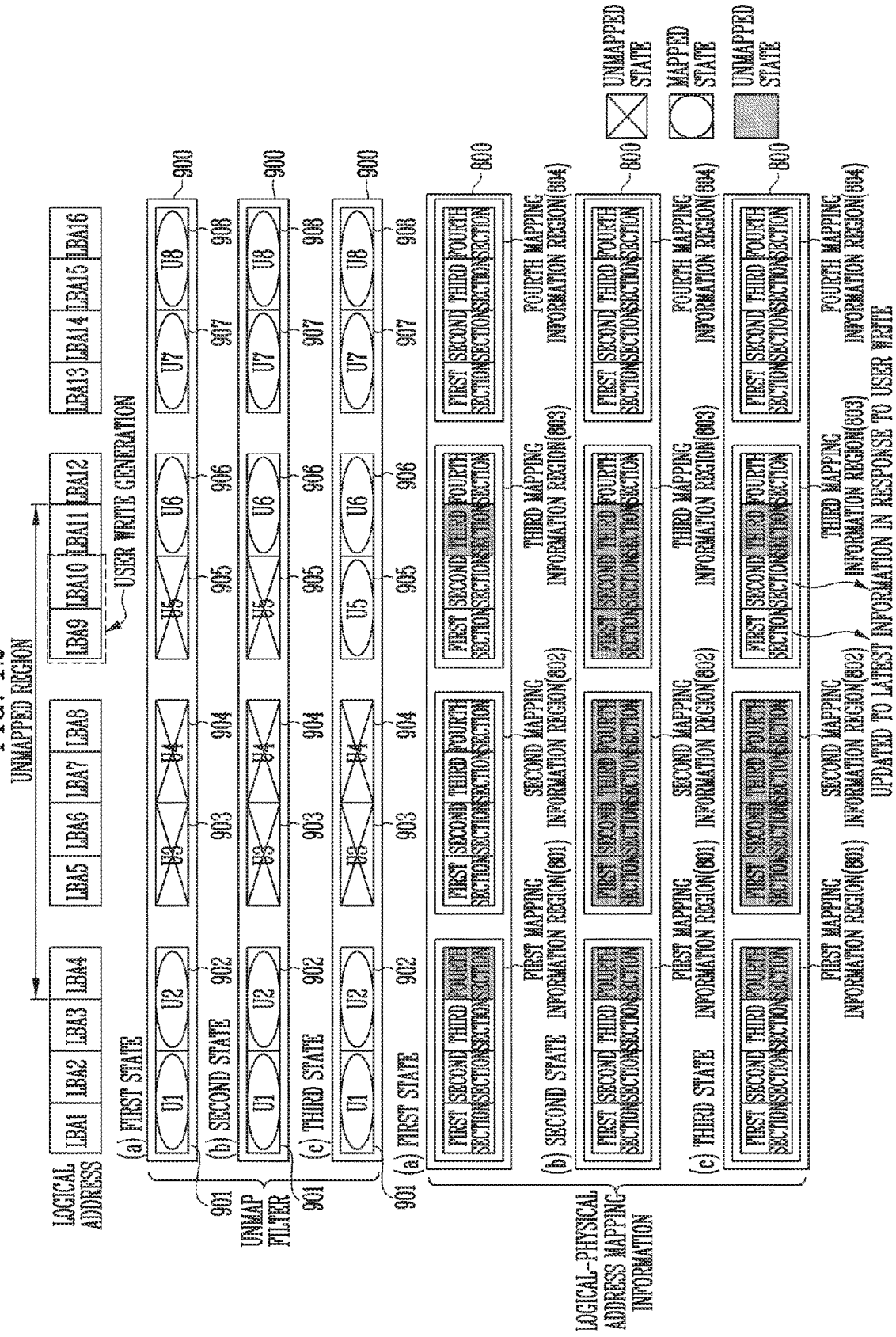
FIG. 12 is a diagram illustrating a method of updating logical-to-physical address mapping information in accordance with an embodiment of the present disclosure.

FIG. 12 is a diagram illustrating a method of updating logical-to-physical address mapping information in accordance with an embodiment of the present disclosure.

Referring to FIG. 12, the memory system 1000 may update the logical-to-physical address mapping information with reference to the unmap filter.

For example, when the fourth to eleventh logical addresses LBA4 to LBA11 are in the unmapped state, the third to fifth unmap bits U3 to U5 of the unmap filter storing area 900 corresponding to the fifth to tenth logical addresses LBA5 to LBA10 may be in the unmapped state, and the fourth section of the first mapping information region 801 and the third section of the third mapping information region 803 of the address mapping information storing area 800 corresponding to the fourth and eleventh logical addresses LBA4 and LBA11 may be in the unmapped state (denoted as "(a) FIRST STATE" in FIG. 12).

The memory system 1000 may check that the third to fifth unmap bits U3 to U5 of the unmap filter storing area 900 corresponding to the fifth to tenth logical addresses LBA5 to LBA10 are in the unmapped state, and update the first to fourth sections of the second mapping information region 802 corresponding to the fifth to eighth logical addresses LBA5 to LBA8 and the first and second sections of the third mapping information region 803 corresponding to the ninth and tenth logical addresses LBA9 and LBA10 in the logical-to-physical address mapping information storing area 800 to the unmapped state (denoted as "(b) SECOND STATE" in FIG. 12).

For example, the updating of the logical-to-physical address mapping information may be performed when a user write operation is performed on the unmapped logical addresses when a write command for the unmapped logical addresses is input from the host 2000. In this case, the memory system 1000 may update the logical-to-physical address mapping information with reference to the unmap filter.

After having updated the logical-to-physical address mapping information in the address mapping information storing area 800 with reference to the unmap filter storing area 900, the memory system 1000 may change the state of the fifth unmap bit U5 corresponding to the ninth and tenth logical addresses LBA9 and LBA10 in the unmap filter storing area 900 from the unmapped state to the mapped state in response to a write command and write data input from the host 2000 and the ninth and tenth logical addresses LBA9 and LBA10 corresponding to the write command, and update the first and second sections of the third mapping information region 803 corresponding to the ninth and tenth logical addresses LBA9 and LBA10 in the address mapping information storing area 800 to the latest mapping information. In other words, the memory system 1000 may map physical addresses to logical addresses input from the host 2000 and modify, based on the mapping of the physical addresses to the logical addresses, the logical-to-physical address mapping information. That is, the memory system 1000 may update the first and second sections of the third mapping information region 803 corresponding to the ninth and tenth logical addresses LBA9 and LBA10 in the address mapping information storing area 800 in response to the ninth and tenth logical addresses LBA9 and LBA10 provided along with a write command (denoted as "(c) THIRD STATE" in FIG. 12).

The updating of the unmap filter and the logical-to-physical address mapping information may be performed through a write operation or a read-modify-write operation in the memory system 1000.

Figure 13:
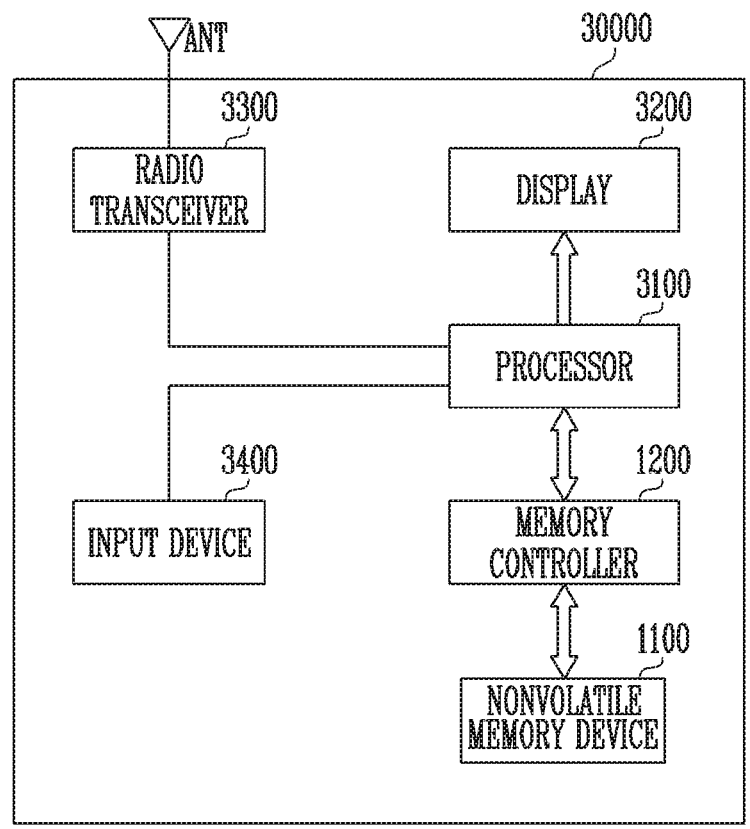
FIG. 13 is a diagram illustrating an example of a memory system in accordance with an embodiment of the present disclosure.

FIG. 13 is a diagram illustrating an example of a memory system 30000 in accordance with an embodiment of the present disclosure.

Referring to FIG. 13, the memory system 30000 may be embodied in a cellular phone, a smartphone, a tablet PC, a personal digital assistant (PDA) or a wireless communication device. The memory system 30000 may include a nonvolatile memory device 1100, and the memory controller 1200 configured to control the operation of the nonvolatile memory device 1100. The memory controller 1200 may control a data access operation, e.g., a program, erase, or read operation, of the nonvolatile memory device 1100 under control of a processor 3100.

Data programmed to the nonvolatile memory device 1100 may be output through a display 3200 under control of the memory controller 1200.

A radio transceiver 3300 may send and receive radio signals through an antenna ANT. For example, the radio transceiver 3300 may change a radio signal received through the antenna ANT into a signal that may be processed in the processor 3100. Therefore, the processor 3100 may process a signal output from the radio transceiver 3300 and transmit the processed signal to the memory controller 1200 or the display 3200. The memory controller 1200 may program a signal processed by the processor 3100 to the nonvolatile memory device 1100. Furthermore, the radio transceiver 3300 may change a signal output from the processor 3100 into a radio signal, and output the changed radio signal to an external device through the antenna ANT. An input device 3400 may be used to input a control signal for controlling the operation of the processor 3100 or data to be processed by the processor 3100. The input device 3400 may be embodied in a pointing device such as a touch pad and a computer mouse, a keypad or a keyboard. The processor 3100 may control the operation of the display 3200 such that data output from the memory controller 1200, data output from the radio transceiver 3300, or data output form the input device 3400 is output through the display 3200.

In an embodiment, the memory controller 1200 capable of controlling the operation of the nonvolatile memory device 1100 may be embodied as a part of the processor 3100 or a chip provided separately from the processor 3100. The memory controller 1200 may be embodied by the example of the memory controller shown in FIG. 2.

Figure 14:
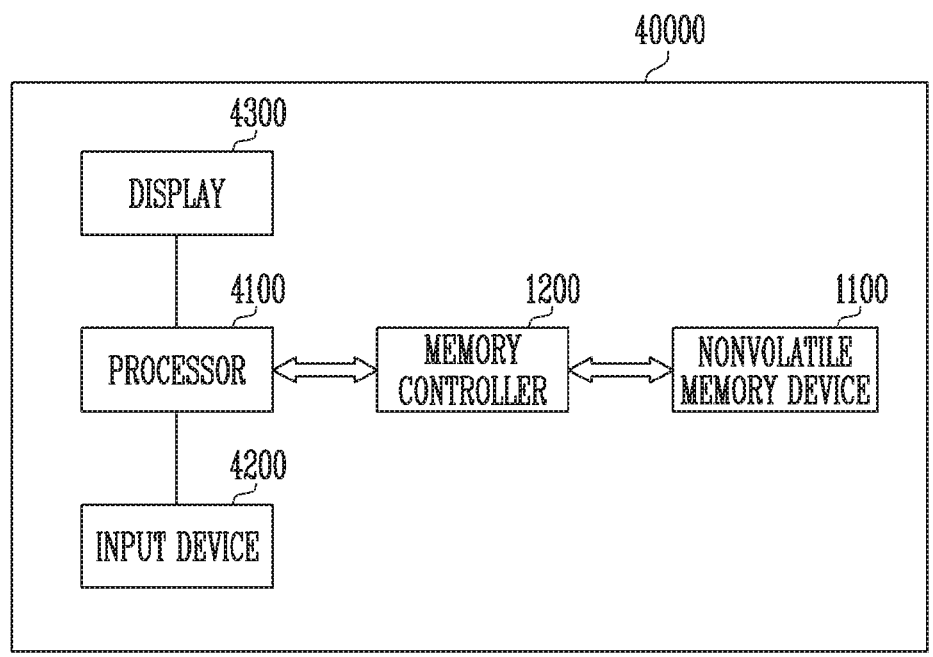
FIG. 14 is a diagram illustrating an example of a memory system in accordance with an embodiment of the present disclosure.

FIG. 14 is a diagram illustrating an example of a memory system 40000 in accordance with an embodiment of the present disclosure.

FIG. 14 is a diagram illustrating an example of a memory system 40000 including the memory controller 1200 shown in FIG. 2.

Referring to FIG. 14, the memory system 40000 may be embodied in a personal computer (PC), a tablet PC, a net-book, an e-reader, a personal digital assistant (PDA), a portable multimedia player (PMP), an MP3 player, or an MP4 player.

The memory system 40000 may includes a nonvolatile memory device 1100, and a memory controller 1200 configured to control the data processing operation of the nonvolatile memory device 1100.

A processor 4100 may output data stored in the nonvolatile memory device 1100 through a display 4300, according to data inputted from an input device 4200. For example, the input device 4200 may be embodied in a pointing device such as a touch pad or a computer mouse, a keypad or a keyboard.

The processor 4100 may control the overall operation of the memory system 40000 and control the operation of the memory controller 1200. In an embodiment, the memory controller 1200 capable of controlling the operation of the nonvolatile memory device 1100 may be embodied as a part of the processor 4100 or a chip provided separately from the processor 4100. The memory controller 1200 may be the exemplary memory controller shown in FIG. 2.

Figure 15:
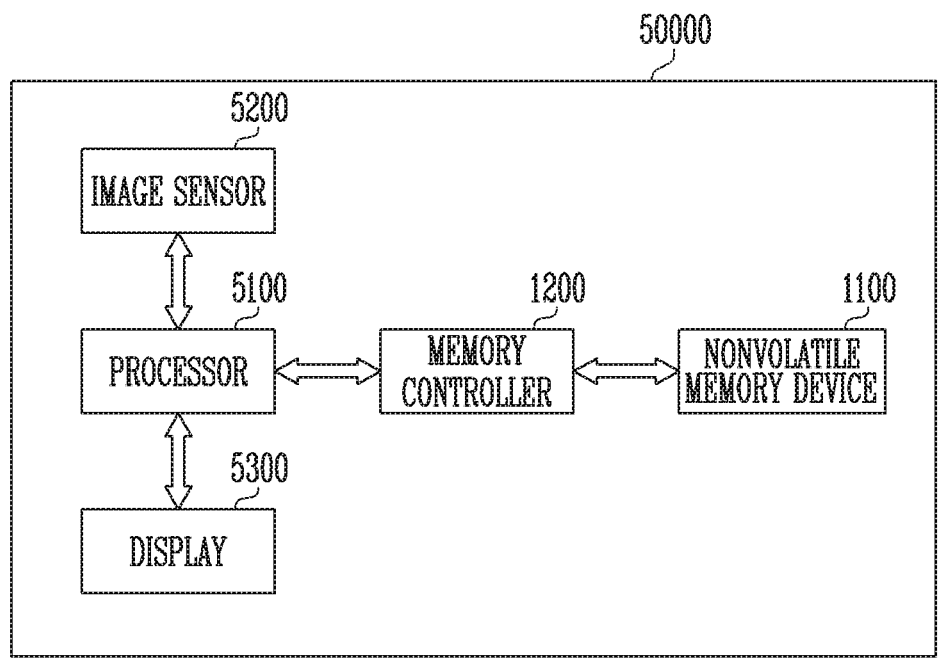
FIG. 15 is a diagram illustrating an example of a memory system in accordance with an embodiment of the present disclosure.

FIG. 15 is a diagram illustrating an example of a memory system 50000 in accordance with an embodiment of the present disclosure.

Referring to FIG. 15, the memory system 50000 may be embodied in an image processing device, e.g., a digital camera, a portable phone provided with a digital camera, a smartphone provided with a digital camera, or a tablet PC provided with a digital camera.

The memory system 50000 may include a nonvolatile memory device 1100, and a memory controller 1200 capable of controlling a data processing operation, e.g., a program, erase, or read operation, of the nonvolatile memory device 1100.

An image sensor 5200 of the memory system 50000 may convert an optical image into digital signals. The converted digital signals may be transmitted to a processor 5100 or the memory controller 1200. Under control of the processor 5100, the converted digital signals may be output through a display 5300 or stored in the nonvolatile memory device 1100 through the memory controller 1200. Data stored in the nonvolatile memory device 1100 may be output through the display 5300 under control of the processor 5100 or the memory controller 1200.

In an embodiment, the memory controller 1200 capable of controlling the operation of the nonvolatile memory device 1100 may be embodied as a part of the processor 5100 or a chip provided separately from the processor 5100. The memory controller 1200 may be the exemplary memory controller shown in FIG. 2.

Figure 16:
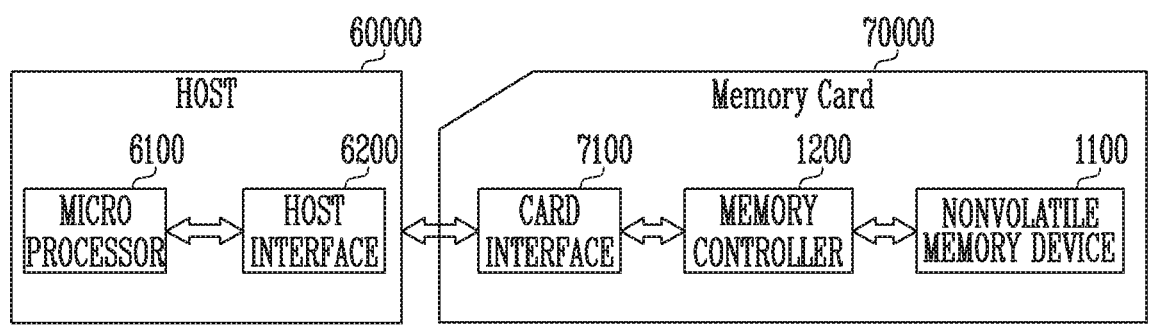
FIG. 16 is a diagram illustrating an example of a memory system in accordance with an embodiment of the present disclosure.

FIG. 16 is a diagram illustrating an example of a memory system 70000 in accordance with an embodiment of the present disclosure.

Referring to FIG. 16, the memory system 70000 may be embodied in a memory card or a smart card. The memory system 70000 may include a nonvolatile memory device 1100, a memory controller 1200, and a card interface 7100.

The memory controller 1200 may control data exchange between the nonvolatile memory device 1100 and the card interface 7100. In an embodiment, the card interface 7100 may be a secure digital (SD) card interface or a multi-media card (MMC) interface, but it is not limited thereto. The memory controller 1200 may be the exemplary memory controller shown in FIG. 2.

The card interface 7100 may interface data exchange between a host 60000 and the memory controller 1200 according to a protocol of the host 60000. In an embodiment, the card interface 7100 may support a universal serial bus (USB) protocol, and an inter-chip (IC)-USB protocol. Here, the card interface may refer to hardware capable of supporting a protocol which is used by the host 60000, software installed in the hardware, or a signal transmission method.

When the memory system 70000 is connected to a host interface 6200 of the host 60000 such as a PC, a tablet PC, a digital camera, a digital audio player, a cellular phone, console video game hardware or a digital set-top box, the host interface 6200 may perform data communication with the nonvolatile memory device 1100 through the card interface 7100 and the memory controller 1200 under control of a microprocessor 6100.

In accordance with various embodiments of the present disclosure, in the operation of a memory system, the time it takes to update logical-to-physical address mapping information may be reduced using an unmap filter.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with one or more other embodiments unless otherwise specifically indicated. Accordingly, it will be understood by those of skill in the art that various changes in form and details may be made without departing from the spirit and scope of the present disclosure as set forth in the following claims.

What is claimed is:

1. A method of operating a memory system, comprising:
   receiving an unmap command corresponding to logical addresses;
   setting a state of at least one unmap bit corresponding to the logical addresses among a plurality of unmap bits included in an unmap filter to an unmapped state in response to the unmap command; and
   updating first mapping information by maintaining logical-to-physical mapping information corresponding to the at least one unmap bit set to the unmapped state, among the logical addresses, and setting logical-to-physical mapping information about a logical address not corresponding to the at least one unmap bit, among the logical addresses, to the unmapped state.

2. The method according to claim 1,
   wherein the unmap filter is stored in a nonvolatile memory device, and
   wherein the operation of setting a state of at least one unmap bit comprises writing the at least one unmap bit set to the unmapped state to the nonvolatile memory device.

3. The method according to claim 1,
wherein the logical-to-physical address mapping information is stored to the nonvolatile memory device,
wherein the operation of setting a state of logical-to-physical address mapping information comprises:
reading the logical-to-physical address mapping information from the nonvolatile memory device;
modifying the state of the logical-to-physical address mapping information read from the nonvolatile memory device to the unmapped state; and
writing the modified logical-to-physical address mapping information to the nonvolatile memory device.

4. The method according to claim 1, wherein each of the plurality of unmap bits corresponds to a plurality of logical addresses.

5. The method according to claim 4, wherein each of the plurality of unmap bits is set to the unmapped state when all of the corresponding logical addresses are unmapped.

6. The method according to claim 1, further comprising setting a state of logical-to-physical address mapping information corresponding to the at least one unmap bit set to the unmapped state, to an unmapped state.

7. The method according to claim 6, further comprising:
receiving a write command for a first logical address among the logical addresses corresponding to the unmap command; and
setting a state of an unmap bit, among the plurality of unmapped bits, corresponding to the first logical address to a mapped state.

8. The method according to claim 7, further comprising:
allocating a physical address corresponding to the first logical address in response to the write command; and
updating a mapping relationship between the first logical address and the physical address to the logical-to-physical address mapping information corresponding to the unmap bit set to a mapped state.

9. The method according to claim 2, wherein the writing comprises simultaneously writing all of the other plurality of unmap bits included in the unmap filter to the nonvolatile memory device.

10. The method according to claim 9,
wherein the unmap filter, before being set to the unmapped state, is stored to a first memory region of the nonvolatile memory device, and
wherein the unmap filter set to the unmapped state is stored to a second memory region of the nonvolatile memory device.

11. A method of operating a memory system, comprising:
checking an unmap bit set to an unmapped state, among a plurality of unmap bits included in an unmap filter stored in a first memory region of a nonvolatile memory;
determining an unmapped first logical address based on the check of the unmap bit set to the unmapped state;
determining an unmapped second logical address from logical-to-physical address mapping information stored in a second memory region of the nonvolatile memory; and
determining an unmapped logical address region based on the first logical address and the second logical address.

12. The method according to claim 11, further comprising loading logical-to-physical address mapping information to a buffer memory based on the unmapped logical address region.

13. The method according to claim 12, further comprising performing at least one of a reading, modifying and writing operation on the logical-to-physical address mapping information loaded to the buffer memory to the second memory region.

14. The method according to claim 12, further comprising:
receiving a write command corresponding to the first logical address; and
setting an unmap bit corresponding to the first logical address to a mapped state.

15. The method according to claim 14, further comprising:
allocating a physical address corresponding to the first logical address in response to the write command; and
updating a mapping relationship between the first logical address and the physical address to the logical-to-physical address mapping information.

16. A memory system comprising:
a nonvolatile memory device configured to store logical-to-physical address mapping information, and an unmap filter including a plurality of unmap bits; and
a memory controller configured to receive an unmap command and logical addresses corresponding to the unmap command from a host, and control the nonvolatile memory device in response to the unmap command,
wherein the memory controller is configured to:
set at least one unmap bit corresponding to the logical addresses among the plurality of unmap bits to an unmapped state, and store the set at least one unmap bit to the nonvolatile memory device; and
maintain logical-to-physical address mapping information corresponding to the at least one unmap bit set to the unmapped state among the logical addresses and modify logical-to-physical mapping information about a logical address not corresponding to the at least one unmap bit, among the logical addresses, to the unmapped state.

17. The memory system according to claim 16, wherein the memory controller is configured to:
read the logical-to-physical address mapping information from the nonvolatile memory device;
temporarily store the logical-to-physical address mapping information read from the nonvolatile memory device to a buffer memory;
modify the state of the logical-to-physical address mapping information temporarily stored in the buffer memory to the unmapped state; and
write the modified logical-to-physical address mapping information to the nonvolatile memory device.

18. The memory system according to claim 16, wherein each of the plurality of unmap bits corresponds to a plurality of logical addresses.

19. The memory system according to claim 18, wherein each of the plurality unmap bits is set to the unmapped state when all of the corresponding logical addresses are unmapped.

20. The memory system according to claim 16,
wherein the memory controller comprises a buffer memory, and
wherein the memory controller is configured to load the logical-to-physical address mapping information stored in the nonvolatile memory device to the buffer memory in response to a read command input from the host.

* * * * *